US010955349B2

(12) United States Patent
Dake

(10) Patent No.: US 10,955,349 B2
(45) Date of Patent: Mar. 23, 2021

(54) FLUORESCENCE OBSERVATION DEVICE

(71) Applicant: NIKON CORPORATION, Tokyo (JP)

(72) Inventor: Fumihiro Dake, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 71 days.

(21) Appl. No.: 16/399,285

(22) Filed: Apr. 30, 2019

(65) Prior Publication Data
US 2019/0257758 A1 Aug. 22, 2019

Related U.S. Application Data

(63) Continuation of application No. PCT/JP2017/039826, filed on Nov. 2, 2017.

(30) Foreign Application Priority Data

Nov. 2, 2016 (JP) .............................. JP2016-215693

(51) Int. Cl.
*G01N 21/64* (2006.01)
*G02B 21/00* (2006.01)
*G02B 21/06* (2006.01)
*G02B 26/10* (2006.01)

(52) U.S. Cl.
CPC ......... *G01N 21/6458* (2013.01); *G01N 21/64* (2013.01); *G02B 21/002* (2013.01);
(Continued)

(58) Field of Classification Search
CPC ... G01N 21/6458; G01N 21/64; G02B 21/002
See application file for complete search history.

(56) References Cited

U.S. PATENT DOCUMENTS

| 5,814,820 A | 9/1998 | Dong et al. |
| 2008/0019637 A1 | 1/2008 | Little et al. |

(Continued)

FOREIGN PATENT DOCUMENTS

| JP | 2010-60656 | 3/2010 |
| JP | 2011-145487 | 7/2011 |

(Continued)

OTHER PUBLICATIONS

Lu Wei, et al., "Stimulated emission reduced fluorescence microscopy: a concept for extending the fundamental depth limit of two-photon fluorescence imaging", Biomedical Optics Express, Jun. 2012, vol. 3, No. 6, 11 pgs. †.

(Continued)

*Primary Examiner* — Hugh Maupin

(57) ABSTRACT

A fluorescence observation device for observing fluorescence from an observed subject including a negative switching fluorescent substance that undergoes a transition from a deactivated state to an activated state triggered by activation light, and is excited by pump light when in the activated state includes: a first intensity-modulating unit that intensity-modulates the activation light at a frequency f1; a second intensity-modulating unit that intensity-modulates probe light at a frequency f3 different from the frequency f1, the probe light inducing stimulated emission of the observed subject; a light-receiving unit that receives fluorescence from the observed subject irradiated with the pump light, and the intensity-modulated probe light and activation light; and a sensing unit that senses a component with a frequency of f1±f3 in a reception-light signal from the light-receiving unit.

13 Claims, 22 Drawing Sheets

(52) U.S. Cl.
CPC .......... *G02B 21/06* (2013.01); *G02B 26/101* (2013.01); *G01N 2021/6463* (2013.01)

(56) References Cited

U.S. PATENT DOCUMENTS

| | | | |
|---|---|---|---|
| 2009/0250632 A1* | 10/2009 | Kempe | G02B 21/0072 |
| | | | 250/459.1 |
| 2010/0054753 A1 | 3/2010 | Futami et al. | |
| 2012/0307238 A1 | 12/2012 | Fujita et al. | |
| 2017/0031145 A1* | 2/2017 | Takiguchi | G02B 21/0036 |

FOREIGN PATENT DOCUMENTS

| | | |
|---|---|---|
| JP | 2014-97191 | 5/2014 |
| JP | 2014-157372 | 8/2014 |
| WO | WO 2011/099269 A1 | 8/2011 |
| WO | 2015/030202 A1 | 3/2015 |

OTHER PUBLICATIONS

International Search Report dated Feb. 6, 2018 in corresponding International Application No. PCT/JP2017/039826.
Written Opinion of the International Searching Authority dated Feb. 6, 2018 in corresponding International Application No. PCT/JP2017/039826.
English Translation by WIPO of the International Preliminary Report on Patentability dated May 7, 2019 in corresponding International Patent Application No. PCT/JP2017/039826 (5 pages).
Extended European Search Report dated May 12, 2020, in corresponding European Patent Application No. 17867176.4 (8 pages).

\* cited by examiner

FLUORESCENCE OBSERVATION DEVICE

CROSS-REFERENCE TO RELATED APPLICATIONS

This application is a continuation of International Application No. PCT/JP2017/039826, filed Nov. 2, 2017, which claims the foreign priority benefit to Japanese Patent Application No. 2016-215693, filed on Nov. 2, 2016, the disclosures of which are incorporated herein by reference.

The contents of the following Japanese and International patent applications are incorporated herein by reference:
  No. 2016-215693 filed on Nov. 2, 2016; and
  PCT/JP2017/039826 filed on Nov. 2, 2017.

BACKGROUND

1. Technical Field

The present invention relates to a fluorescence observation device.

2. Related Art

Microscopes that construct an image by exciting a fluorescent substance with two photons, irradiating the fluorescent substance with a laser beam that induces stimulated emission, and acquiring reduced fluorescence have been known (see Non-Patent Literature 1, for example).

Non-Patent Literature 1: Lu Wei et. al., Biomedical Optics Express 1465-1475, vol. 3, No. 6, 1 Jun. 2012

SUMMARY

According to a first aspect of the present invention, a fluorescence observation device includes a fluorescence observation device for observing fluorescence from an observed subject including a negative switching fluorescent substance that undergoes a transition from a deactivated state to an activated state triggered by activation light, and is excited by pump light when in the activated state, the fluorescence observation device including: a first intensity-modulating unit that intensity-modulates the activation light at a frequency f1; a second intensity-modulating unit that intensity-modulates probe light at a frequency f3 different from the frequency f1, the probe light inducing stimulated emission of the observed subject; a light-receiving unit that receives fluorescence from the observed subject irradiated with the pump light, and the intensity-modulated probe light and activation light; and a sensing unit that senses a component with a frequency of $f1 \pm f3$ in a reception-light signal sensed at the light-receiving unit.

According to a second aspect of the present invention, a fluorescence observation device includes a fluorescence observation device for observing fluorescence from an observed subject including a positive switching fluorescent substance that is excited by pump light when in an activated state, and undergoes a transition from the activated state to a deactivated state triggered by deactivation light, the fluorescence observation device including: a first intensity-modulating unit that intensity-modulates the pump light at a frequency f2; a second intensity-modulating unit that intensity-modulates probe light at a frequency f3 different from the frequency f2, the probe light inducing stimulated emission of the observed subject; a light-receiving unit that receives fluorescence from the observed subject irradiated with the intensity-modulated pump light and probe light, and the deactivation light; and a sensing unit that senses a component with a frequency of $2f2 \pm f3$ in a reception-light signal sensed at the light-receiving unit.

According to a third aspect of the present invention, a fluorescence observation method includes a fluorescence observation method for observing fluorescence from an observed subject including a negative switching fluorescent substance that undergoes a transition from a deactivated state to an activated state triggered by activation light, and is excited by pump light when in the activated state, the fluorescence observation method including: intensity-modulating the activation light at a frequency f1; intensity-modulating probe light at a frequency f3 different from the frequency f1, the probe light inducing stimulated emission of the observed subject; irradiated with the pump light, and the intensity-modulated probe light and activation light; and receiving, at a light-receiving unit, fluorescence from the observed subject, and sensing a component with a frequency of $f1 \pm f3$ in a reception-light signal sensed at the light-receiving unit.

According to a fourth aspect of the present invention, a fluorescence observation method includes a fluorescence observation method for observing fluorescence from an observed subject including a positive switching fluorescent substance that is excited by pump light when in an activated state, and undergoes a transition from the activated state to a deactivated state triggered by deactivation light, the fluorescence observation method including: intensity-modulating the pump light at a frequency f2; intensity-modulating probe light at a frequency f3 different from the frequency f2, the probe light inducing stimulated emission of the observed subject; irradiating the observed subject with the intensity-modulated pump light and probe light, and the deactivation light; and receiving, at a light-receiving unit, fluorescence from the observed subject, and sensing a component with a frequency of $2f2 \pm f3$ in a reception-light signal sensed at the light-receiving unit.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Laser light used in the present embodiment includes pump light, probe light, and switching light. Pump light excites a fluorescent substance, and makes the fluorescent substance generate fluorescence. Probe light induces stimulated emission from a fluorescent substance to thereby reduce fluorescence. Switching light triggers a transition of a fluorescent substance from the deactivated state to the activated state, or from the activated state to the deactivated state. A negative switching fluorescent substance undergoes a transition from the deactivated state to the activated state triggered by switching light. In this case, the switching light is particularly also referred to as activation light. A positive switching fluorescent substance undergoes a transition from the activated state to the deactivated state triggered by switching light. In this case, the switching light is particularly also referred to as deactivation light. In addition, frequencies used in intensity-modulation of switching light, pump light, and probe light are referred to as f1, f2, and f3, respectively.

Figure 1:
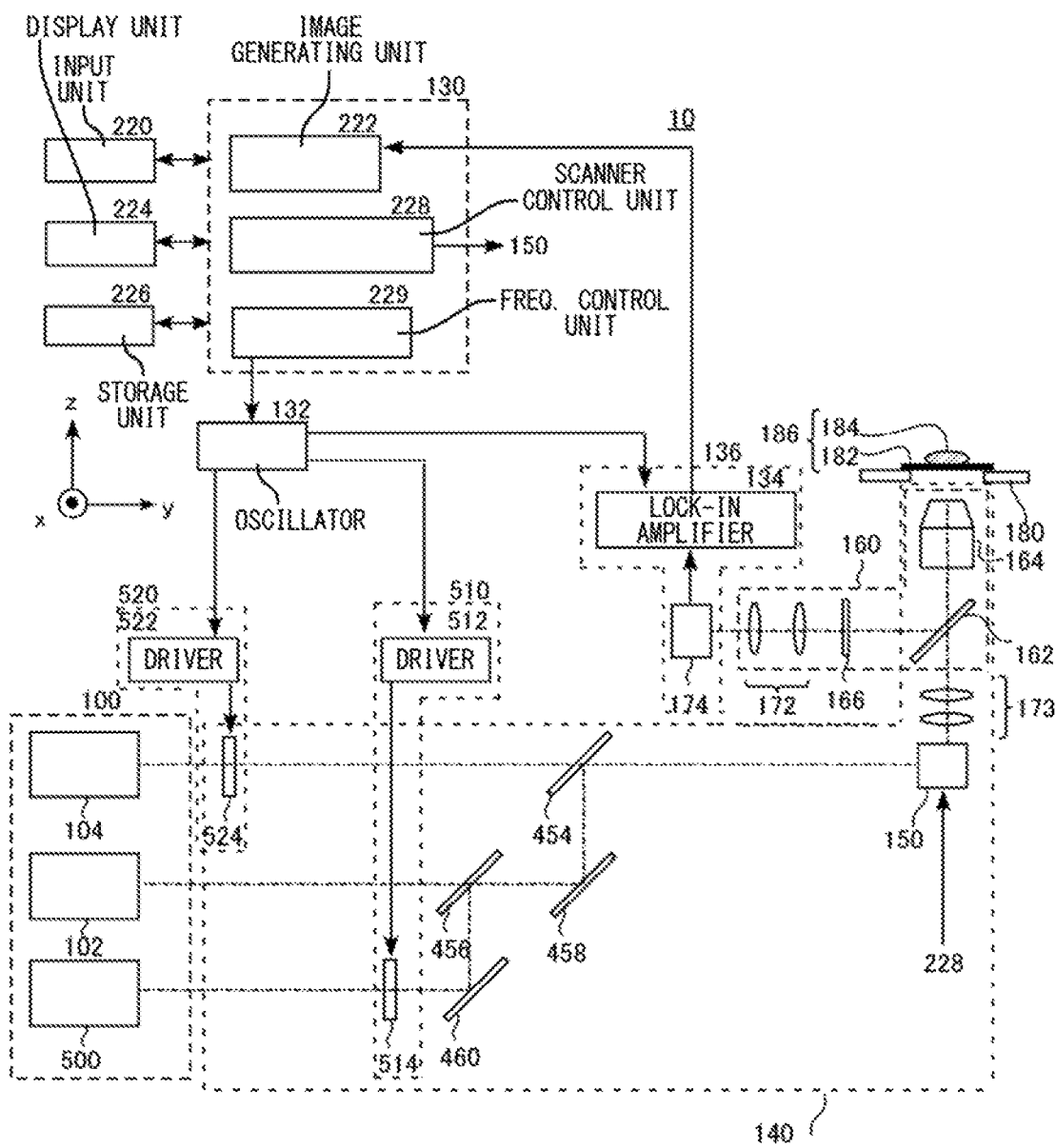
FIG. 1 is a figure illustrating the configuration of a microscope device 10 according to the present embodiment.

FIG. 1 is a figure illustrating the configuration of a microscope device 10 as an exemplary fluorescence observation device according to the present embodiment. The microscope device 10 irradiates an observed subject including a negative switching fluorescent substance with pump light, probe light, and activation light to thereby make the fluorescent substance of the observed subject generate a signal of fluorescence (hereinafter, referred to as reduced fluorescence, a reduced fluorescence signal, etc.) produced by the fluorescent substance, and reduced due to stimulated emission. The reduced fluorescence signal can be sensed by intensity-modulating the probe light and the activation light. Specific methods therefor include lock-in sensing or the like. Since reduced fluorescence signals obtained by lock-in sensing are obtained as a result of multiple products of the pump light, the probe light, and the activation light, the signal generation region is restricted. Thereby, spatial resolution can be enhanced. Note that hereinafter, reduced fluorescence is collectively referred to as fluorescence in some cases. In addition, hereinafter, microscopes that acquire reduced fluorescence produced from fluorescent substances that can undergo optical switching are referred to as reduced fluorescence microscopes. x, y, and z axes are illustrated in FIG. 1 for explanation.

The microscope device 10 includes: a light source 100 that outputs pump light, probe light, and activation light; an illuminating optical system 140 that illuminates an observed subject 184 with pump light, probe light, and activation light; an observation optical system 160 for observing light emitted from the observed subject 184; and a sensing unit 136 that senses light through the observation optical system 160. The microscope device 10 further includes a stage 180 that supports a specimen 186. The microscope device 10 further includes: a control unit 130 that performs overall control of the microscope device 10; and an input unit 220, a display unit 224, and a storage unit 226 that transmit and receive signals to and from the control unit 130.

The specimen 186 has the observed subject 184, and a slide glass 182 on which the observed subject 184 is placed. The observed subject 184 is biological cells, for example. A negative switching fluorescent substance is introduced into the observed subject 184. Examples of the negative switching fluorescent substance include Dronpa, for example.

The light source 100 has a laser light source 102 for pump light, a laser light source 104 for probe light, and a laser light source 500 for activation light. All of the laser light sources 102, 104, 500 are continuous wave laser light sources, for example, and moreover output laser light with wavelengths that are different from each other. Pump light excites a fluorescent substance, and makes the fluorescent substance generate fluorescence. Probe light induces stimulated emission from a fluorescent substance to thereby reduce fluorescence. Activation light triggers a transition of a fluorescent substance from the deactivated state to the activated state. The wavelength of the pump light is shorter than the wavelength of the probe light. For example, the wavelength of the pump light is 488 nm, and the wavelength of the probe light is 600 nm. The wavelength of the activation light is still shorter, and for example is 405 nm. These wavelengths of the pump light and probe light are set as appropriate according to the absorption band (absorption spectrum) and fluorescence band (fluorescence spectrum) of a fluorescent substance, and the wavelength of the activation light is also set as appropriate according to activation of the fluorescent substance. These wavelengths of the pump light, probe light, and activation light may be set automatically, or may be input by a user through the input unit 220.

The illuminating optical system 140 has acousto-optical modulators 514, 524 (hereinafter, also referred to as AOMs), mirrors 460, 458, a dichroic mirror 454, a scanning unit 150, a lens pair 173, a dichroic mirror 162, and an object lens 164. The observation optical system 160 has the object lens 164, the dichroic mirror 162, an optical filter 166, and a lens pair 172.

By controlling a voltage that a driver 512 applies across the AOM 514 which activation light enters, generation of first-order diffracted light of the activation light is controlled. It is possible to maintain the state where first-order diffracted light is produced always (the ON-state, that is, the state where the intensity is the maximum), it is possible to maintain the state where first-order diffracted light is not produced always (the OFF-state, that is, the state where the intensity is the minimum), and it is possible to modulate the optical intensity. For example, if a constant voltage value is given from the driver 512, the optical intensity has a constant value depending on the voltage value. For example, if a voltage value given from the driver 512 is zero for a length of time, the optical intensity also becomes zero. For example if the voltage waveform of the driver 512 is a sine wave, the intensity of light is modulated corresponding to the sine wave. In the present embodiment, activation light is intensity-modulated at a frequency f1 of several MHz, for example, by the AOM 514 based on oscillation from an oscillator 132. An advantage of the AOM 514 is that it can perform intensity-modulation at a relatively high frequency of several MHz. Note that these AOM 514 and driver 512 constitute a first intensity-modulating unit 510. Note that switching time of a fluorescent substance (a length of time required for a transition from the deactivated state to the activated state) is desirably short for the period determined by f1.

The configurations of the AOM 524 which probe light enters, and a driver 522 that applies a voltage to the AOM 524 are also the same as the above-mentioned configurations of the AOM 514, and the driver 512. Thereby, probe light is intensity-modulated at a frequency f3 of several tens MHz, for example, by the AOM 524 based on oscillation from the oscillator 132. Note that the frequency f3 is made different from the above-mentioned frequency f1. Note that these AOM 524 and driver 522 constitute a second intensity-modulating unit 520.

The mirror 460 reflects the intensity-modulated activation light, and a dichroic mirror 456 combines the activation light, and the pump light, and guides them to the mirror 458. The mirror 458 reflects the activation light, and the pump light, and the dichroic mirror 454 combines the intensity-modulated probe light with the activation light, and the pump light such that they become coaxial, and guides them to the scanning unit 150.

The scanning unit 150 is disposed at a position which is almost conjugate with the pupil plane of the object lens 164. Because of this, the lens pair 173 is desirably placed between the scanning unit 150 and the dichroic mirror 162. An example of the scanning unit 150 is a galvano scanner which has a pair of galvano mirrors that can be rotated in mutually orthogonal directions. The angles of those galvano mirrors are changed to scan a spot position of laser light in the observed subject 184 in the x and y directions. Another example of the scanning unit 150 is a resonant scanner (resonant scanner). The resonant scanner has a resonant mirror (resonant mirror) that operates resonantly. The resonant scanner includes a resonant mirror for main scanning, and a galvano mirror for sub-scanning, for example. Using a resonant scanner enables faster scanning.

Laser light output from the scanning unit 150 is transparently transmitted through the dichroic mirror 162, and is guided to the object lens 164. The object lens 164 concentrates the laser light onto the observed subject 184.

Fluorescence produced from a fluorescent substance of the observed subject 184 is reflected off the dichroic mirror 162, and the pump light, probe light, and activation light are removed from the fluorescence by the optical filter 166. Due to the lens pair 172, the fluorescence enters a light-receiving unit 174 placed at a position which is almost conjugate with the object lens pupil plane. Note that the dichroic mirror 162 may be placed between the lens pair 173 and the scanning unit 150, or may be placed on the light source side of the scanning unit 150.

The sensing unit 136 includes the light-receiving unit 174, and a lock-in amplifier 134.

The light-receiving unit 174 is disposed at a position which is almost conjugate with the pupil plane of the object lens 164. An example of the light-receiving unit 174 is a photomultiplier. The light-receiving unit 174 performs photoelectric conversion to output an electrical signal corresponding to the intensity of the received fluorescence. Output of the light-receiving unit 174 is input to the lock-in amplifier 134, and sensed by lock-in sensing. The lock-in sensing is described later.

The input unit 220, display unit 224, storage unit 226, and control unit 130 may be a PC or the like, for example. The input unit 220 is where input from a user to the control unit 130 is accepted, and for example is a keyboard, a touch panel, a mouse, or the like. The display unit 224 is a display that displays GUIs, sensing results, and observation images, for example. The storage unit 226 stores programs, parameters, or the like for controlling the microscope device 10, and sensing results, observation images, or the like.

The control unit 130 has a frequency control unit 229, a scanner control unit 228, and an image generating unit 222. According to input from a user, or automatically based on a fluorescent substance, the frequency control unit 229 controls an oscillation frequency generated at the oscillator 132. The scanner control unit 228 controls the scanning unit 150. The image generating unit 222 generates an image based on a result of sensing by the sensing unit 136, and displays the image on the display unit 224.

Figure 2:
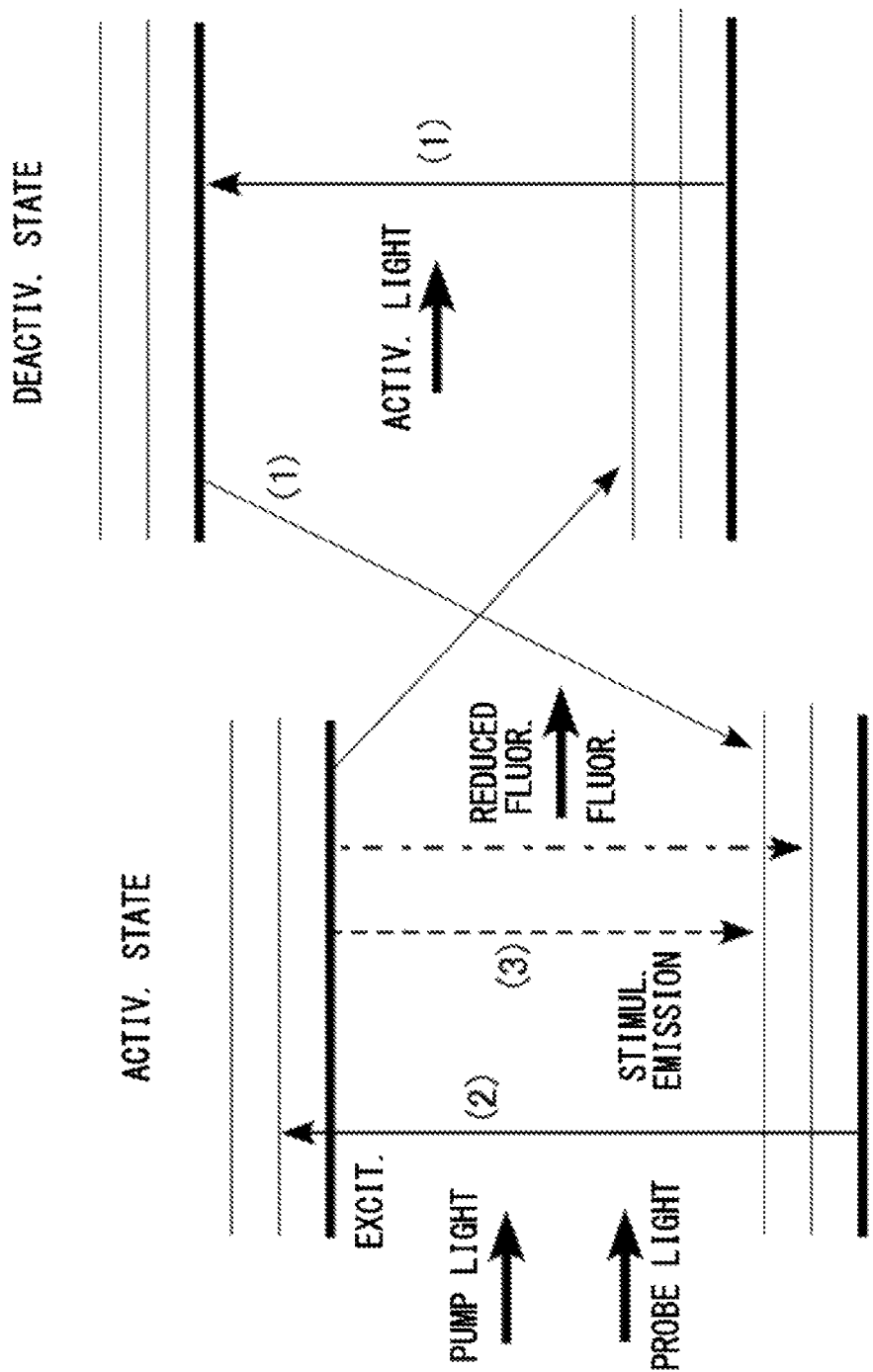
FIG. 2 is a state transition diagram.
Figure 3:
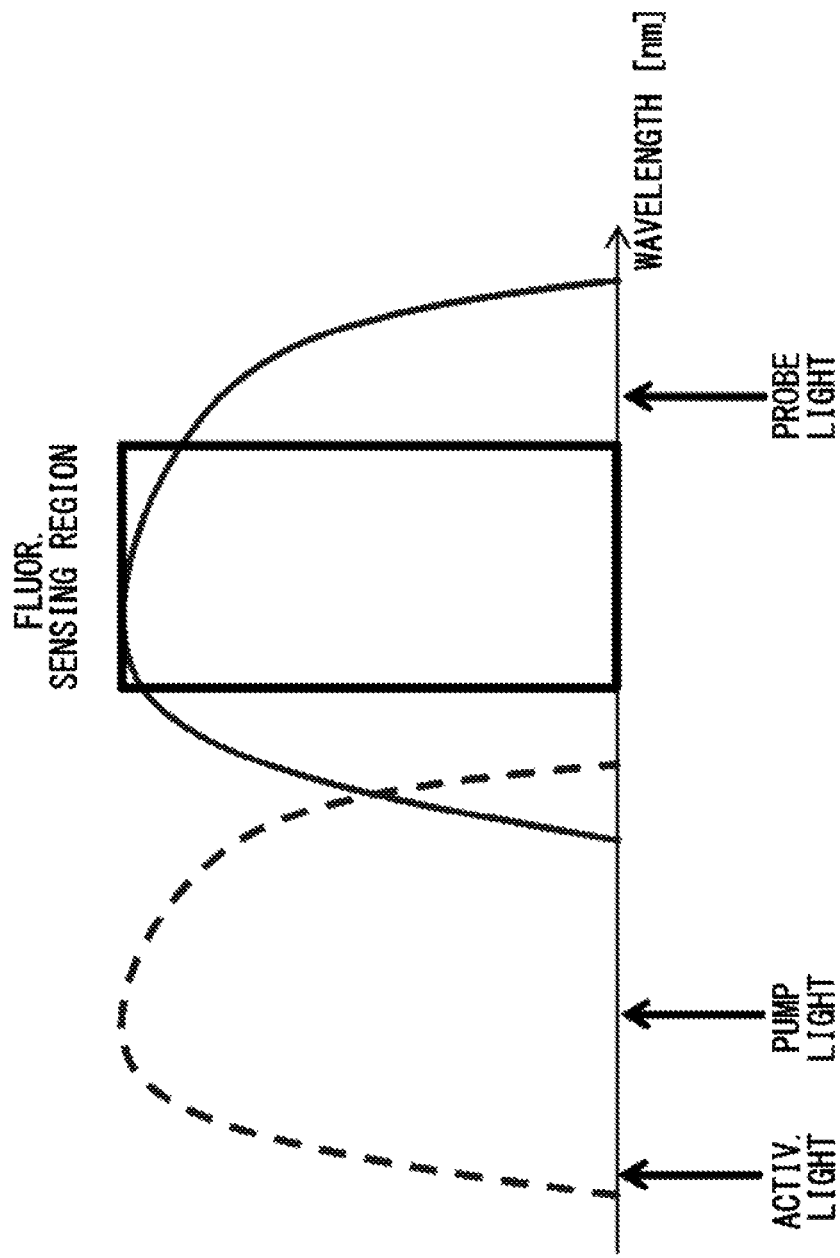
FIG. 3 is a conceptual diagram illustrating the relationship between individual wavelengths.
Figure 4:
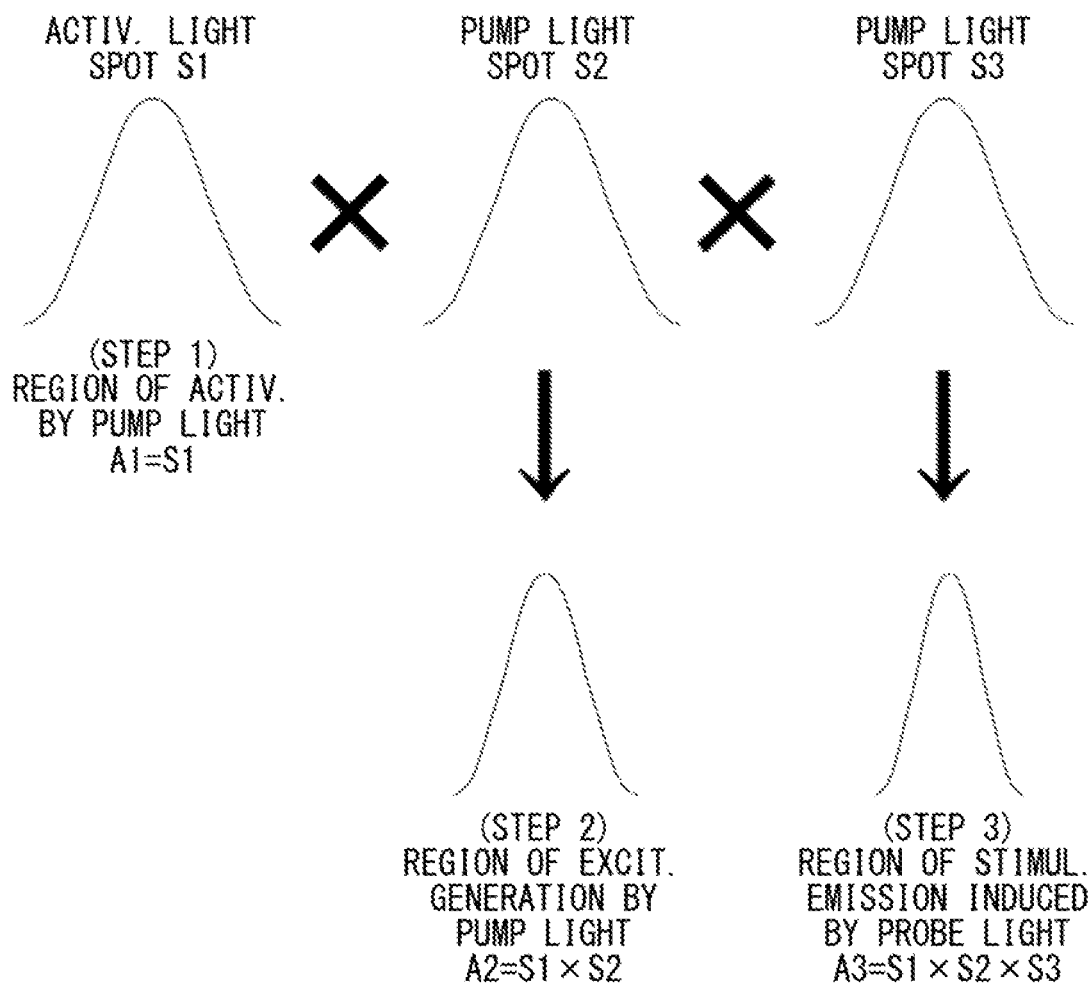
FIG. 4 is a figure for explaining resolution enhancement.
Figure 5:
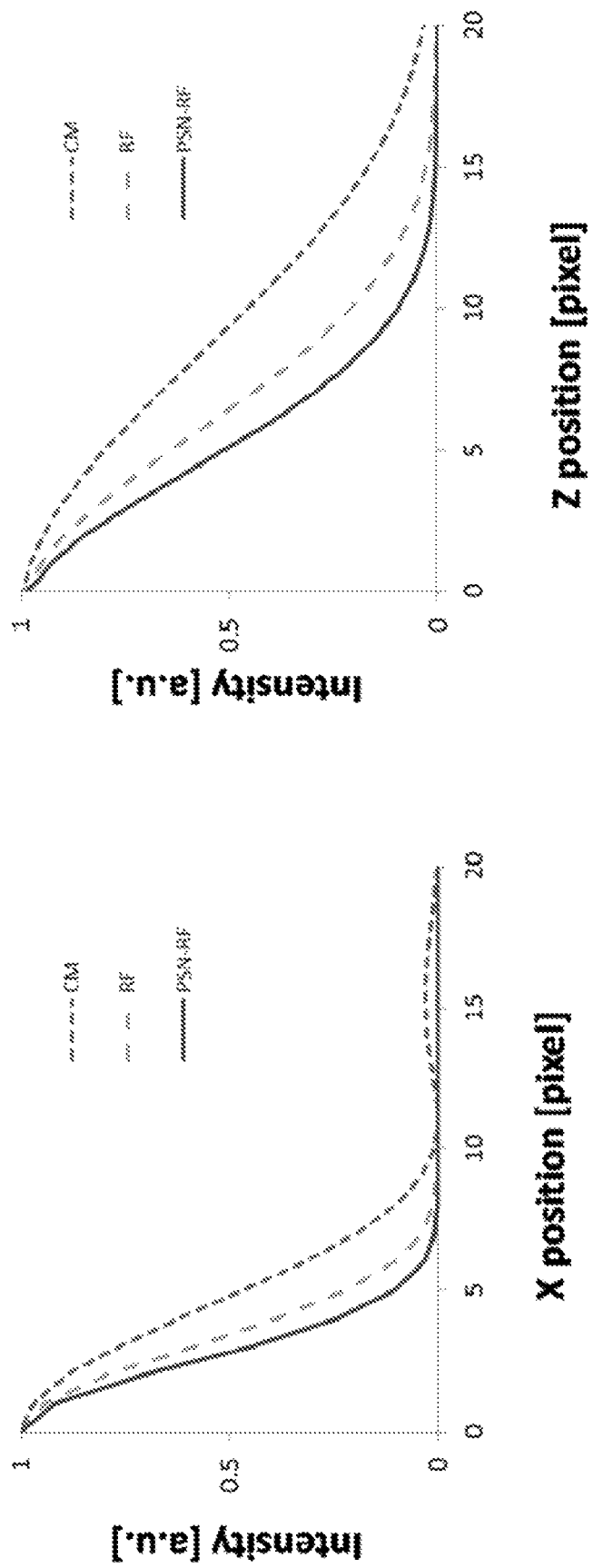
FIG. 5 illustrates a signal generation region simulation result.

Principles of observation based on reduced fluorescence using the microscope device 10 are explained with reference to FIG. 2 to FIG. 6B. FIG. 2 is a state transition diagram. FIG. 3 is a conceptual diagram illustrating the relationship between individual wavelengths. FIG. 4 is a figure for explaining resolution enhancement. FIG. 5 illustrates a signal generation region simulation result.

The state transitions of a negative switching fluorescent substance occur as illustrated in FIG. 2. First, from the deactivated state where the negative switching fluorescent substance cannot emit light, it transitions to the activated state where the negative switching fluorescent substance can emit light upon being excited by activation light. In the activated state, the negative switching fluorescent substance is excited by pump light, and emits fluorescence reduced due to stimulated emission induced by probe light. Here, fluorescence signals produced through the following processes over time are sensed. (Step 1) Switching triggered by activation light (from the deactivated state to the activated state) (1)
(Step 2) Excitation by pump light (2)
(Step 3) Stimulated emission induced by probe light (3)

Since fluorescence signals produced through these processes are obtained as the product of activation light, pump light, and probe light, the signal generation region is restricted. This mechanism is described later. A fluorescence signal generated is defined as a PSN-RF (Photo-Switchable probe (Negative) Reduced Fluorescence) signal.

In FIG. 3, the broken line indicates the absorption band of a particular fluorescent substance, and the solid line indicates the fluorescence band of the fluorescent substance. Preferably, the wavelength of pump light is set to be included in the absorption band, and the wavelength of probe light is set to be longer than the wavelength corresponding to the peak intensity in the fluorescence band. Thereby, a wavelength region including the peak intensity in the fluorescence band can be set as the fluorescence sensing region.

The activation light intensity is modulated at the frequency f1, and the probe light intensity is modulated at the frequency f3. $I_{Act}$, $I_{Pump}$, and $I_{Probe}$ are defined as time waveforms of the activation light, pump light, and probe light, respectively, and then:

[Formula 1]

$$I_{Act}(t)=I_1[1+\cos(f_1 t)] \quad (1.1)$$

$$I_{Pump}(t)=I_2 \quad (1.2)$$

$$I_{probe}(t)=I_3[1+\cos(f_3 t)] \quad (1.3)$$

Here, I1, I2, and I3 are the optical intensities of the activation light, pump light, and probe light, respectively. The PSN-RF signal is:

[Formula 2]

$$I_{PSN-RF}(t) \propto I_{Act}(t)I_{Pump}(t)I_{probe}(t) \quad (1.4)$$
$$= I_1 I_2 I_3 [1+\cos(f_1 t)][1+\cos(f_3 t)]$$
$$= I_1 I_2 I_3 \left[\frac{3}{2} + \cos f_1 t + \cos f_3 t + \frac{1}{2}\cos[(f_1 - f_3)t] + \frac{1}{2}\cos[(f_1 + f_3)t]\right]$$

Accordingly, by demodulating the fluorescence signal sensed at the light-receiving unit 174 by the lock-in amplifier 134 using f1+f3 or f1−f3 as the demodulation frequency, a PSN-RF signal with enhanced resolution can be acquired. The demodulation frequency may be any one of the sum of and the difference between two or more frequencies that are used for intensity-modulation. This is simply represented by "±". More specifically, the above-mentioned demodulation frequency is input from the oscillator 132 to the lock-in amplifier 134. The lock-in amplifier 134 extracts a signal that is synchronized with the demodulation frequency. While the scanning unit 150 is scanning light spots in the observed subject 184, the lock-in amplifier 134 performs lock-in sensing pixel by pixel, and stores results of the lock-in sensing in the storage unit 226, associating a result about each pixel with positional information about the pixel. The image generating unit 222 reads out the sensing results associated with the positional information from the storage unit 226, generates a reduced fluorescence observation image, and displays the image on the display unit 224.

FIG. 4 is a figure illustrating principles of resolution enhancement. S1, S2, and S3 are defined as the intensity distributions of light spots of activation light, pump light, and probe light, respectively. For each spot in the figure, the vertical axis corresponds to intensities, and the horizontal axis corresponds to spatial coordinates.

(Step 1) If $A_1$ is defined as the generation distribution indicating generation of optical switching triggered by activation light, since the generation distribution is equal to the intensity distribution of activation light:

[Formula 3]

$$A_1 = S_1 \quad (1.5)$$

(Step 2)
$A_2$ is defined as the generation distribution indicating generation of excitation by pump light. Since this signal generation distribution is equal to the product of the generation distribution $A_1$ at Step 1 and the intensity distribution $S_2$ of a pump light spot:

[Formula 4]

$$A_2 = A_1 S_2 = S_1 S_2 \quad (1.6)$$

(Step 3)
$A_3$ is defined as the generation distribution indicating generation of stimulated emission induced by probe light. Since this signal generation distribution is equal to the product of the generation distribution $A_2$ at Step 2 and the intensity distribution $S_3$ of a probe light spot:

[Formula 5]

$$A_3 = A_2 S_3 = S_1 S_2 S_3 \quad (1.7)$$

This generation distribution $A_3$ is equivalent to the generation distribution of PSN-RF signals. In this manner, by sensing fluorescence signals produced in the distribution as represented by the product of the three types of light, it is possible to emphasize contribution of fluorescence generation from the center of a light spot, and to de-emphasize contribution of fluorescence generation from the perimeter of the light spot as illustrated in FIG. 4; therefore, the region of signal generation from the observed subject 184 can be restricted to the diffraction limitation or lower; as a result, the resolution can be enhanced.

FIG. 5 illustrates a signal generation region simulation result. For comparison, signal generation regions of a typical confocal microscope (CM), and a reduced fluorescence (RF) microscope are illustrated. It can be known that, due to the effect attained by producing signals in the distribution as represented by the product of activation light, pump light, and probe light, the signal generation region of PSN-RF becomes sharp in both the X direction, and Z direction.

Figure 6A:
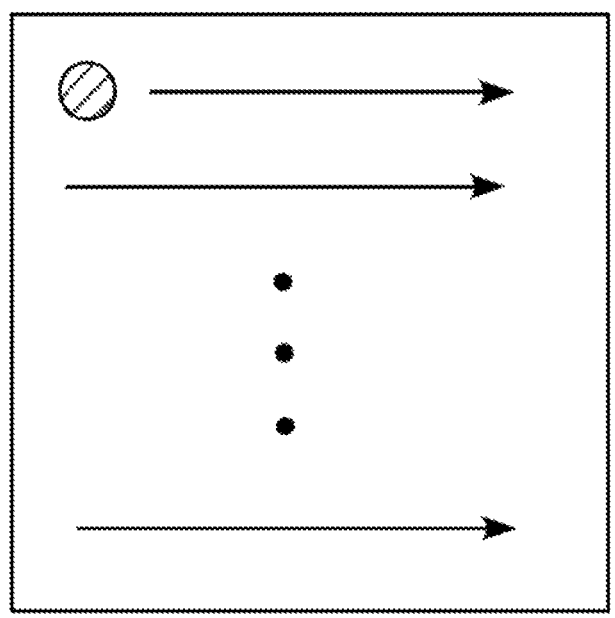
FIG. 6A is a conceptual diagram for explaining the scan speed and sensing speed of a scanning unit 150.
Figure 6B:
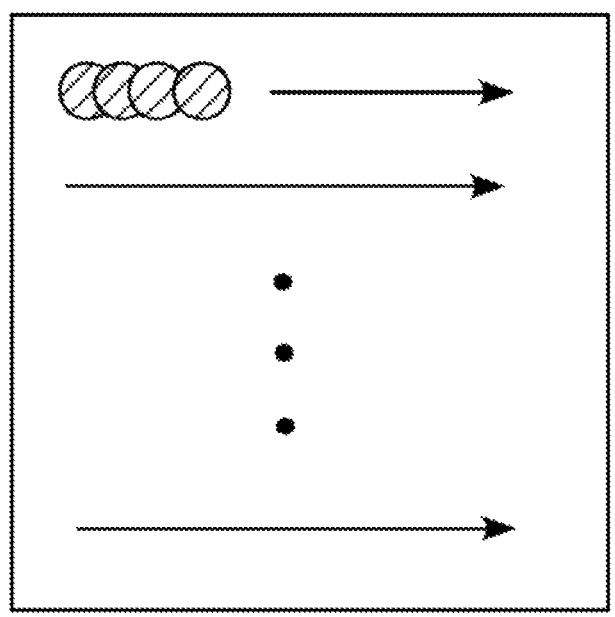
FIG. 6B is a conceptual diagram for explaining the scan speed and sensing speed of the scanning unit 150.
Figure 6B:
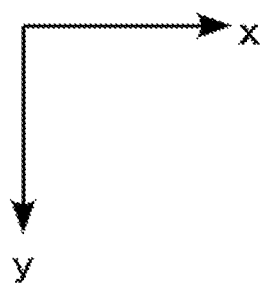

FIG. 6A and FIG. 6B are conceptual diagrams for explaining the scan speeds and sensing speeds of the scanning unit 150. Since the length of time required for scanning in a main scanning (the x direction in the figure) of a galvano scanner is longer than that of a resonant scanner, it may be considered that the position of a beam will not change almost at all in the length of time required for sensing by demodulation using a difference frequency as illustrated in FIG. 6A. However, since the length of time required for scanning in a main scanning (the x direction in the figure) of a resonant scanner is shorter than that of the galvano scanner, the position of a beam changes as illustrated in FIG. 6B in the length of time required for sensing by demodulation using a difference frequency, and there is a fear that it becomes difficult to acquire accurate images. However, if demodulation is performed using a sum frequency, since the frequency for demodulation is high, the length of time required for sensing also becomes short, and it may be considered that the position of a beam does not change almost at all in a predetermined length of time required for signal sensing at a predetermined position even if the resonant scanner is used. Accordingly, accurate images can be acquired while at the same time high speed sensing is performed using the resonant scanner.

Figure 7:
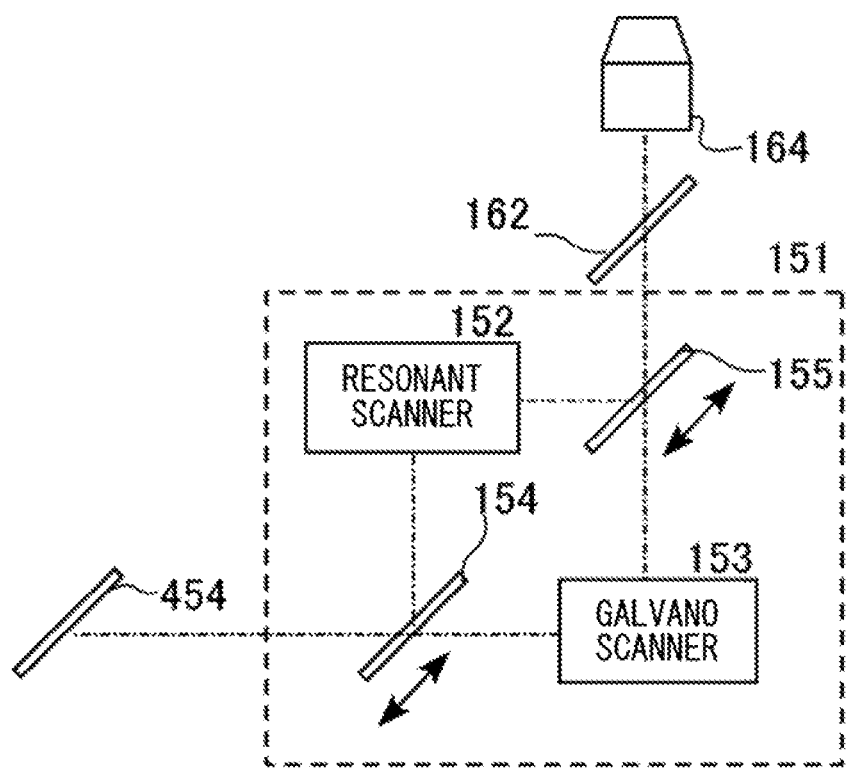
FIG. 7 illustrates another exemplary scanning unit 151.

FIG. 7 illustrates another exemplary scanning unit 151. The scanning unit 151 has a resonant scanner 152, a galvano scanner 153, and a pair of mirrors 154, 155. The pair of mirrors 154, 155 are individually movable in the directions of arrows in the figure, and the resonant scanner 152 or the galvano scanner 153 is selected for use based on the positions of the pair of mirrors 154, 155.

FIG. 7 illustrates the state where the resonant scanner 152 is selected. In this case, the mirror 154 is disposed on the optical path of light emitted from the dichroic mirror 454, and the mirror 155 is disposed on the optical path of light emitted from the resonant scanner 152. Thereby, the light reflected off the mirror 154 enters the resonant scanner 152. The light deflected in a predetermined direction at the resonant scanner 152 is reflected off the mirror 155, is transparently transmitted through the dichroic mirror 162, and enters the object lens 164.

On the other hand, if the galvano scanner 153 is selected, the mirror 154 is moved aside out from the optical path of the light emitted from the dichroic mirror 454, and moreover the mirror 155 is moved aside out from between the galvano scanner 153 and the dichroic mirror 162. Thereby, the light enters the galvano scanner 153, and the light deflected at the galvano scanner 153 is transparently transmitted through the dichroic mirror 162, and enters the object lens 164.

The scanning unit 151 allows a use of a different one of the resonant scanner 152 and the galvano scanner 153 depending on an intended purpose. Note that examples of the means for moving the positions of the pair of mirrors 154, 155 include linear motors, for example, but this is not the sole example. The pair of mirrors 154, 155 may each be disposed on a corresponding turret, and the pair of mirrors 154, 155 may be moved along with rotation of the turrets. Instead of the pair of mirrors 154, 155, a pair of dichroic mirrors may be disposed. In such a case, the resonant scanner 152 can be used for light with a wavelength that is reflected off the pair of dichroic mirrors, and the galvano scanner 153 can be used for light with a wavelength that is transparently transmitted through the pair of dichroic mirrors. Note that the positions of the resonant scanner 152 and the galvano scanner 153 in FIG. 7 may be switched with one another.

Figure 8:
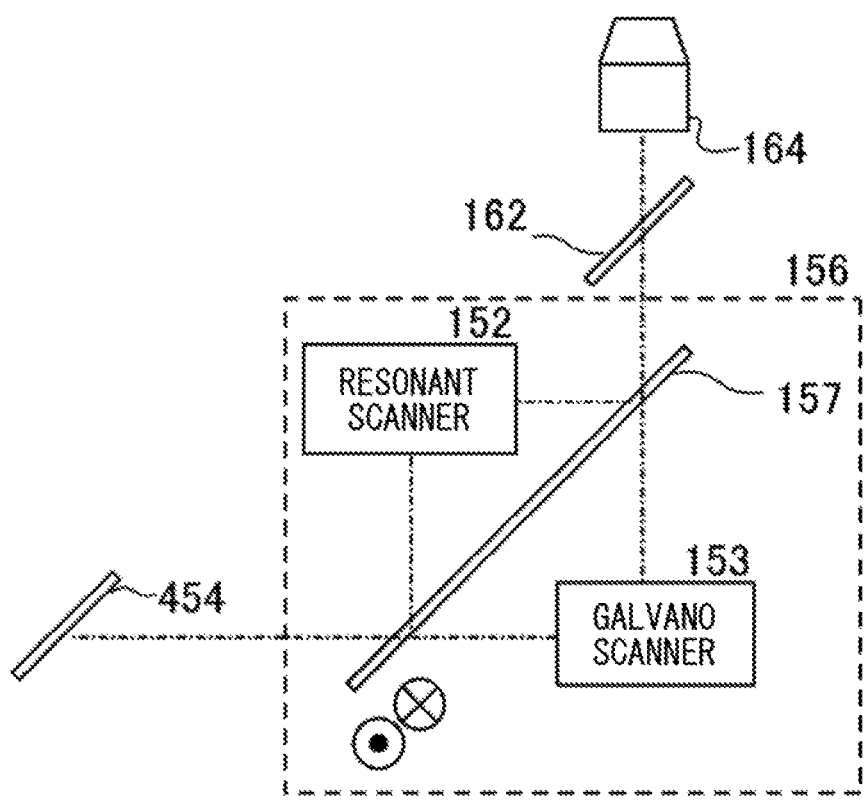
FIG. 8 illustrates still another exemplary scanning unit 156.

FIG. 8 illustrates still another exemplary scanning unit 156. Configurations in FIG. 8 that are the same as those in FIG. 7 are given the same numbers, and explanation thereof are omitted.

The scanning unit 156 has a mirror 157 formed by integrating the pair of mirrors 154, 155 of the scanning unit 151, instead of the separate mirrors 154, 155. The mirror 157 is movable in the direction perpendicular to the sheet of paper. Here, the state illustrated in FIG. 8 corresponds to the state illustrated in FIG. 7, and in the state, light is reflected off the mirror 157, and so the resonant scanner 152 is used. On the other hand, if, in the state illustrated in FIG. 8, the mirror 157 is moved in the direction perpendicular to the sheet of paper, and moved aside out from the optical path between the dichroic mirror 454 and the galvano scanner 153, and the optical path between the galvano scanner 153 and the dichroic mirror 162 simultaneously, the galvano scanner 153 becomes ready for use.

Figure 9:
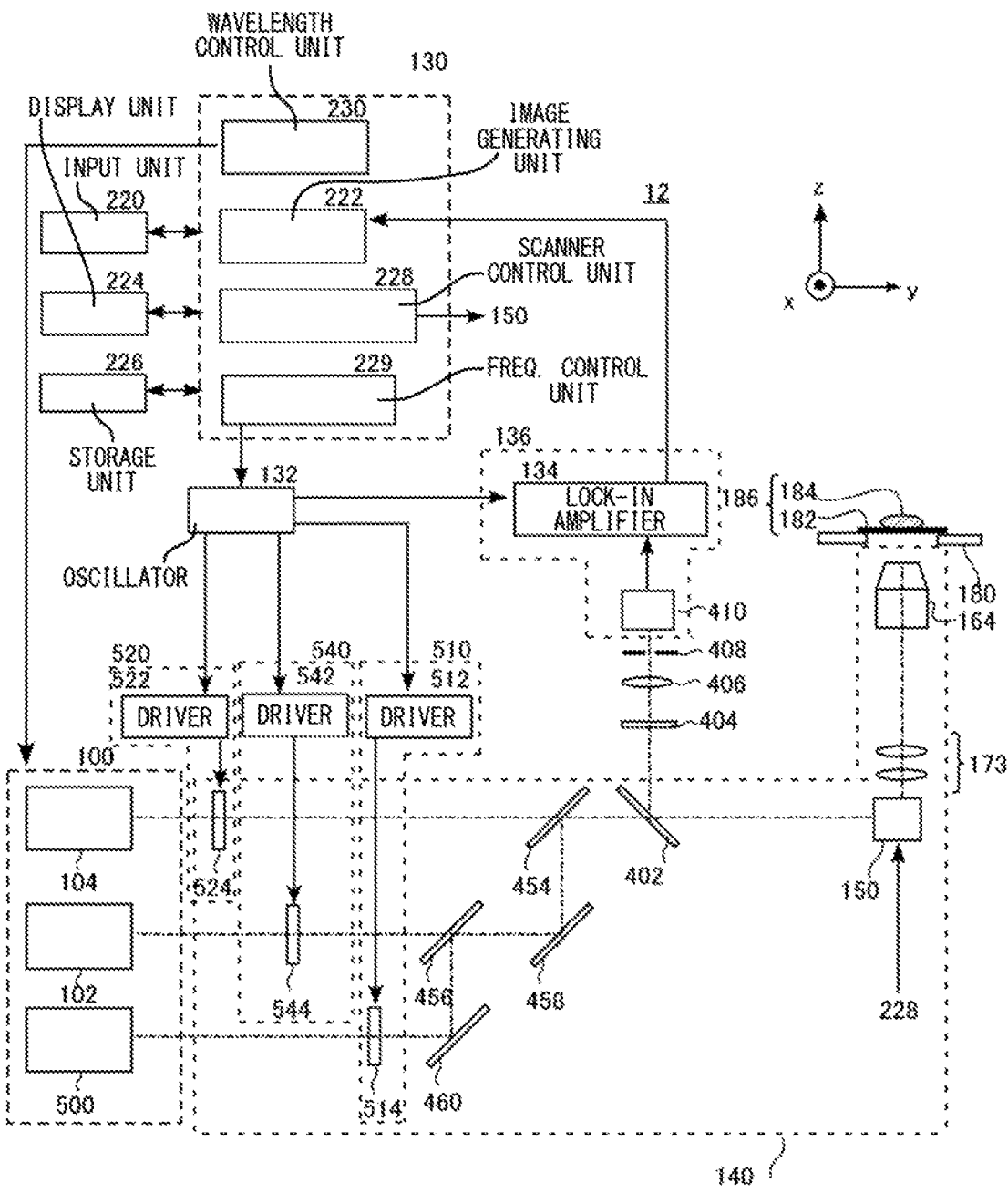
FIG. 9 is a figure illustrating the configuration of another microscope device 12.

FIG. 9 is a figure illustrating the configuration of another microscope device 12. The microscope device 12 can be used as a reduced fluorescence microscope similar to the microscope device 10, and moreover can be used also as a confocal microscope. Configurations of the microscope device 12 that are the same as the configurations in the microscope device 10 are given the same reference numerals, and explanations thereof are omitted.

The microscope device 12 has a third intensity-modulating unit 540 that modulates pump light. The third intensity-modulating unit 540 has an AOM 544 disposed on the optical path of pump light, and a driver 542 that drives the AOM 544 based on oscillation from the oscillator 132.

Furthermore, the microscope device 12 has a dichroic mirror 402 that reflects fluorescence, and transparently transmits therethrough pump light and probe light, and is disposed on the optical path between the dichroic mirror 454 and the scanning unit 150. Furthermore, the microscope device 12 has an optical filter 404, a lens 406, and a light-receiving unit 410 which light reflected off the dichroic mirror 402 enters. The optical filter 404, and light-receiving unit 410 may have the same configurations as those of the optical filter 166, and light-receiving unit 174 of the microscope device 10. The microscope device 12 further has a pinhole 408. The pinhole 408 is disposed at a position which is conjugate with the observed subject 184. The lens 406 concentrates light onto the pinhole 408. In addition, the light-receiving unit 410 is placed in proximity to the pinhole 408. Alternatively, it may be placed at a position which is substantially conjugate with the pinhole using an unillustrated lens.

The microscope device 12 further has a wavelength control unit 230 that controls the wavelengths of light of the laser light sources 102, 104, 500.

With the above-mentioned configuration, fluorescence from the observed subject 184 passes through the scanning unit 150, is reflected off the dichroic mirror 402, and is received by the light-receiving unit 410 after passing through the optical filter 404, lens 406, and pinhole 408. Thereby, even if the observation position of the observed subject 184 is changed by the scanning unit 150, the spot position at the pinhole 408 remains unchanged due to descanning by the scanning unit 150. The hole size of the pinhole 408 is variable, and details thereof are described below.

Figure 10:
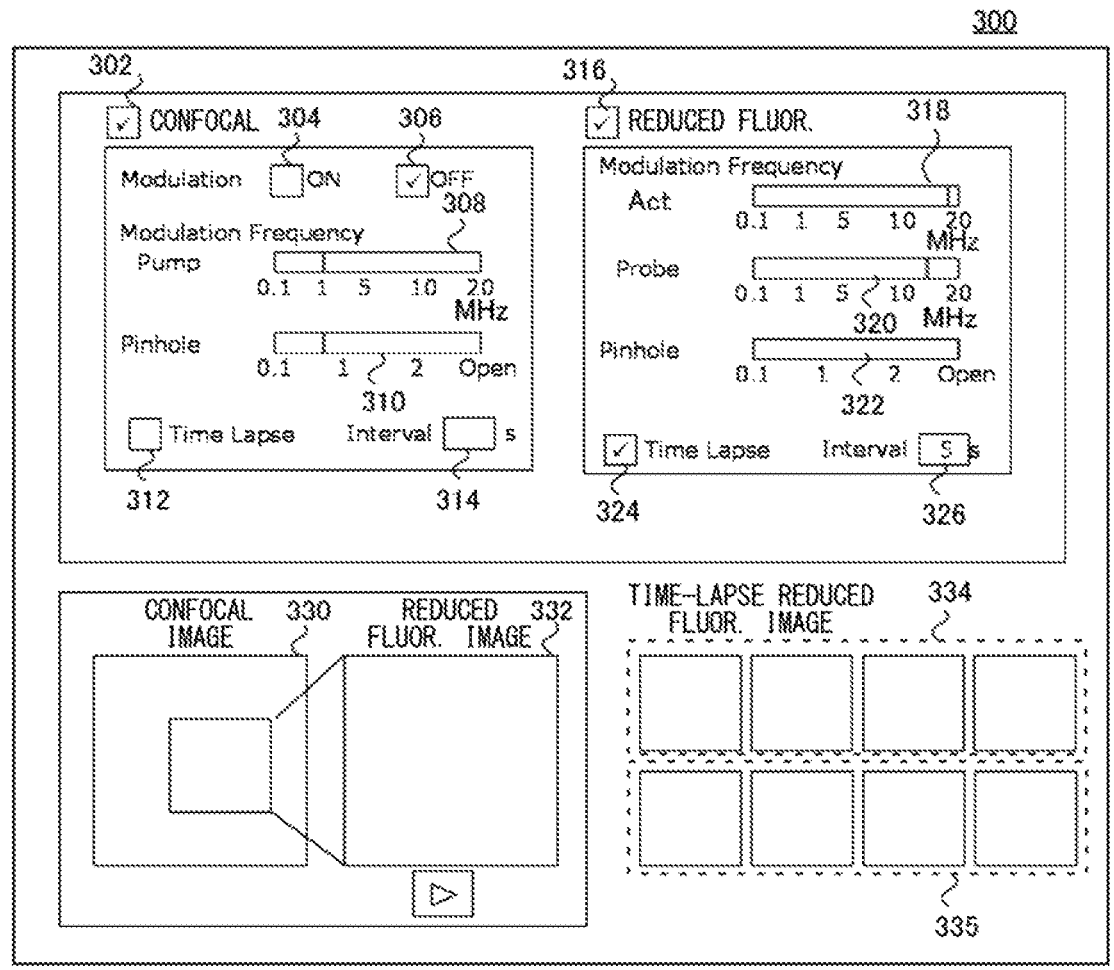
FIG. 10 is an exemplary GUI screen 300 used in the microscope device 12.

FIG. 10 is an exemplary GUI screen 300 used in the microscope device 12. The GUI screen 300 is displayed on the display unit 224, and input from a user is accepted using the input unit 220.

A check box 302 is an input field for selecting whether or not to acquire a confocal observation image. A check box 304 is an input field for specifying that pump light is to be modulated in confocal observation, and a check box 306 is an input field for specifying that the pump light is not to be modulated.

An input field 308 is an input field for the modulation frequency for pump light, and includes a specified modulation frequency indicated by a vertical bold line, along with scales accompanied by numbers in the unit of MHz. An input field 310 is an input field for specifying the size of the pinhole. "OPEN" at the input field 310 indicates that the hole size is the maximum. Furthermore, a specified hole size is indicated by a vertical bold line, along with scales for the size, with "1" indicating the airy size. Here, the airy size means the size of a light spot of diffraction limitation that is determined by a wavelength and a numerical aperture, and is a standardized value of pinhole diameter.

Furthermore, a check box 312 is an input field for selecting whether or not to acquire time-lapse images of confocal observation. An input field 314 is an input field for time intervals for time-lapse image acquisition.

A check box 316 is an input field for selecting whether or not to acquire a reduced fluorescence observation image. An input field 318 is an input field for the modulation frequency for activation light, and includes a specified modulation frequency indicated by a vertical bold line, along with scales accompanied by numbers in the unit of MHz. An input field 320 is an input field for the modulation frequency for probe light, and includes a specified modulation frequency indicated by a vertical bold line, along with scales accompanied by numbers in the unit of MHz.

An input field 322 is an input field for the hole size of the pinhole 408 in reduced fluorescence observation, and has the same configuration as that of the input field 310. In addition, a check box 324 and an input field 326 are input fields about time lapse in reduced fluorescence observation, and have the same configurations as those of the check box 312, and input field 314.

The GUI screen 300 includes a confocal observation image 330, and a reduced fluorescence observation image 332 that are displayed next to each other. Instead, the images may be displayed as a superimposed image. In addition, a link to the other may be given to each of the images, and, for example, by clicking a region of interest in the confocal observation image 330, the reduced fluorescence observation image 332 may be displayed. Furthermore, if time-lapse image acquisition is selected for confocal observation, time-lapse images 334 are displayed next to each other in the order of time. Similarly, if time-lapse image acquisition is selected for reduced fluorescence observation, time-lapse images 335 are displayed next to each other in the order of time.

Figure 11:
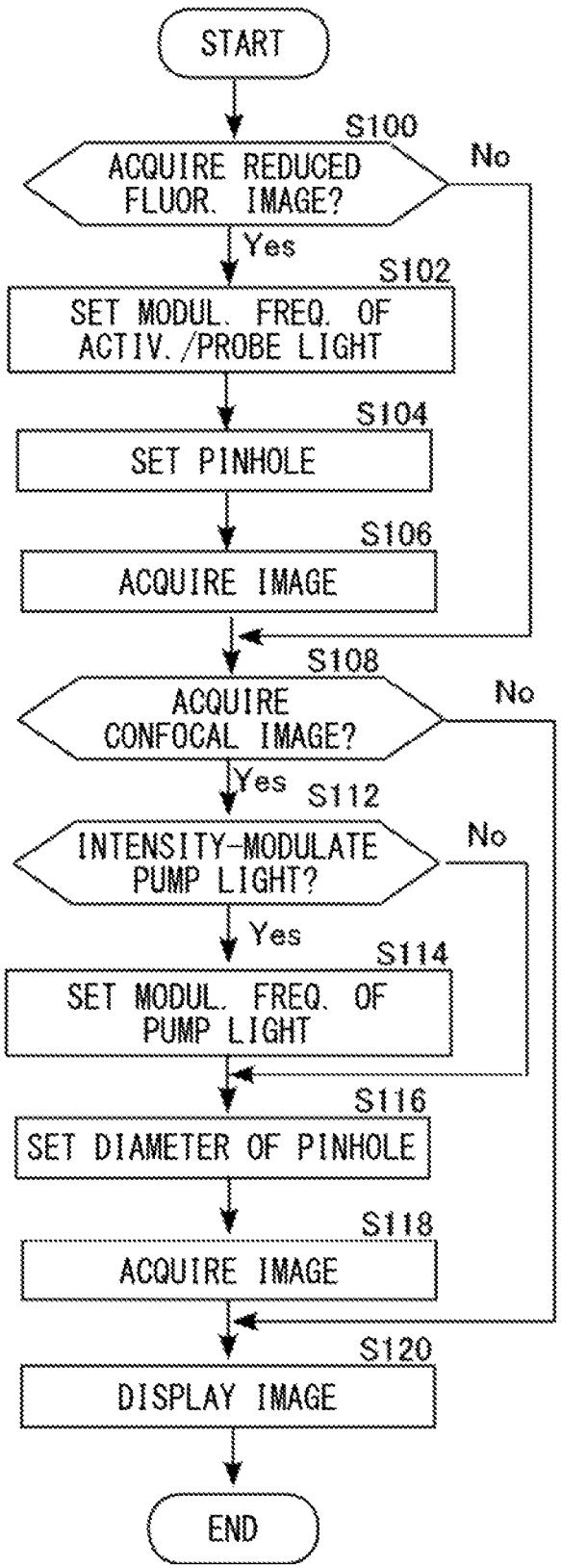
FIG. 11 is a flowchart illustrating an exemplary operation (S10) of the microscope device 12.

FIG. 11 is a flowchart illustrating an exemplary operation (S10) of the microscope device 12.

In the flowchart S10, the control unit 130 determines, based on input in the check box 316 on the GUI screen 300, whether or not to acquire a reduced fluorescence observation image (S100). If the result of the determination at Step S100 is Yes, the control unit 130 sets, in the oscillator 132 and based on input in the input fields 318, 320, the modulation frequencies for activation light and probe light for reduced fluorescence observation (S102). Note that the state of the pump light is set to the ON-state. Furthermore, the control unit 130 sets, in the oscillator 132, the demodulation frequencies based on input in the input fields 323, 326 (S101).

The control unit 130 sets the diameter of the pinhole 408 (S104). At the time of reduced fluorescence observation, the pinhole 408 is opened in the default setting, that is, "OPEN" is set in the input field 322 in FIG. 10 in the default setting. If a user altered the value of the input field 322 from the default setting, the size of the pinhole 408 is set based on the value after the alteration. Since, by opening the pinhole 408, it is also possible at the time of reduced fluorescence observation to sense fluorescence whose imaging relationship has been disturbed by scattering or the like even if the fluorescence is produced from a focal surface which is the pinhole conjugate plane, more photons can be sensed; as a result, enhancement of the signal-to-noise ratio becomes possible.

Based on the above-mentioned settings, a reduced fluorescence observation image is acquired (S106). The method of acquiring a reduced fluorescence observation image is the same as that explained in relation to the microscope device 10, and explanations thereof are omitted.

After Step S106 or if the result of the determination at Step S100 is No, it is determined, based on input in the check box 302, whether or not to acquire a confocal observation image (S108). If it is determined to acquire a confocal observation image (S108: Yes), it is determined, based on the check boxes 304, 306, whether or not to modulate pump light used for confocal observation (S112). If it is determined to perform the modulation (S112: Yes), a modulation frequency input in the input field 308 is set (S114).

After Step S114 or if it is determined at Step S112 not to modulate pump light (S112: No), the diameter of the pinhole 408 is set based on input by a user in the input field 310 (S116).

A confocal observation image is acquired based on the above-mentioned settings (S118). Explaining in more details, by setting the state of the AOM 544 to the ON-state for pump light or intensity-modulating pump light, and by setting the states of activation light and probe light to the OFF-states, fluorescence is sensed at the sensing unit 136 pixel by pixel while the scanning unit 150 is scanning the observed subject 184. Results of the sensing are stored in the storage unit 226 in association with positional information.

The image generating unit 222 reads out the sensing results associated with the positional information from the storage unit 226, generates the confocal observation image 330 and the reduced fluorescence observation image 332, and displays the images on the display unit 224 (S120).

Furthermore, if an instruction to acquire confocal observation time-lapse images is accepted at the check box 312, the microscope device 12 executes confocal observation at the time intervals set in the input field 314, and generates individual observation images. Similarly, if an instruction to acquire reduced fluorescence observation time-lapse images is accepted at the check box 324, the microscope device 12 executes reduced fluorescence observation at the time intervals set in the input field 326, and generates individual observation images.

The microscope device 12 may further sense fluorescence generated in light switching processes. In this case, the state of the AOM 524 for probe light is set to the OFF-state, and the state of the AOM 544 for pump light is set to the ON-state. The AOM 514 intensity-modulates activation light at f1. Fluorescence generated thereby is sensed at the light-receiving unit 410, and sensed by lock-in sensing at the lock-in amplifier 134 at the demodulation frequency f1. Since this signal is produced as the product of activation light and pump light, and so a sectioning capability is essentially provided, the pinhole 408 is preferably opened.

Note that, in another possible configuration, an image of the observed subject 184 may be acquired through confocal observation over a large field of view, and a partial region in the confocal observation image may be specified to acquire a reduced fluorescence observation image. In this case, an image may be acquired through confocal observation, and a range suited for reduced fluorescence observation may be selected automatically.

Figure 12:
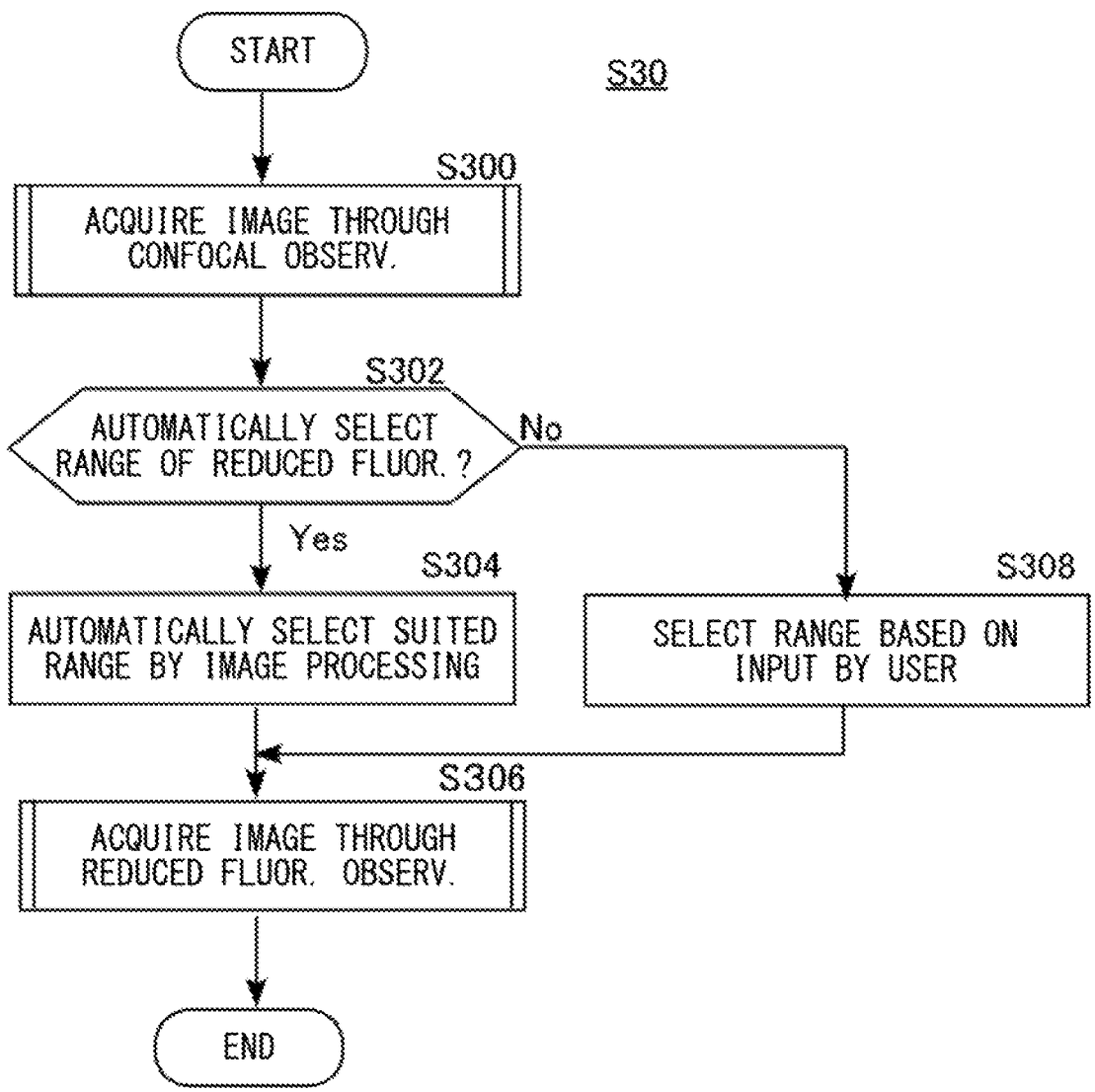
FIG. 12 is a flowchart of an operation (S30) of selecting a range of reduced fluorescence observation based on confocal observation.

FIG. 12 is a flowchart of an operation (S30) of selecting a range of reduced fluorescence observation based on confocal observation. First, an image is acquired through confocal observation (S300). In this case, Steps S112 to S118 in the operation (S10) in FIG. 11 are executed. Next, it is determined, based on input from a user, whether or not to automatically select a range of reduced fluorescence observation (S302).

If it is determined to perform the automatic selection (S302: Yes), the confocal image undergoes image processing analysis, and a range suited for reduced fluorescence observation is selected. For example, the image may undergo differential filtering, and a region where many peaks are produced is selected.

On the other hand, if it is determined not to perform the automatic selection (S302: No), a region of reduced fluorescence observation is set based on selection by a user (S308). In this case, selection of a region may be accepted on the confocal observation image 330 illustrated in FIG. 10.

Reduced fluorescence observation is executed in the region set at Step S304 or S308 to acquire an observation image (S306). In this case, Steps S102 to S106 in the operation (S10) in FIG. 11 are executed.

Figure 13:
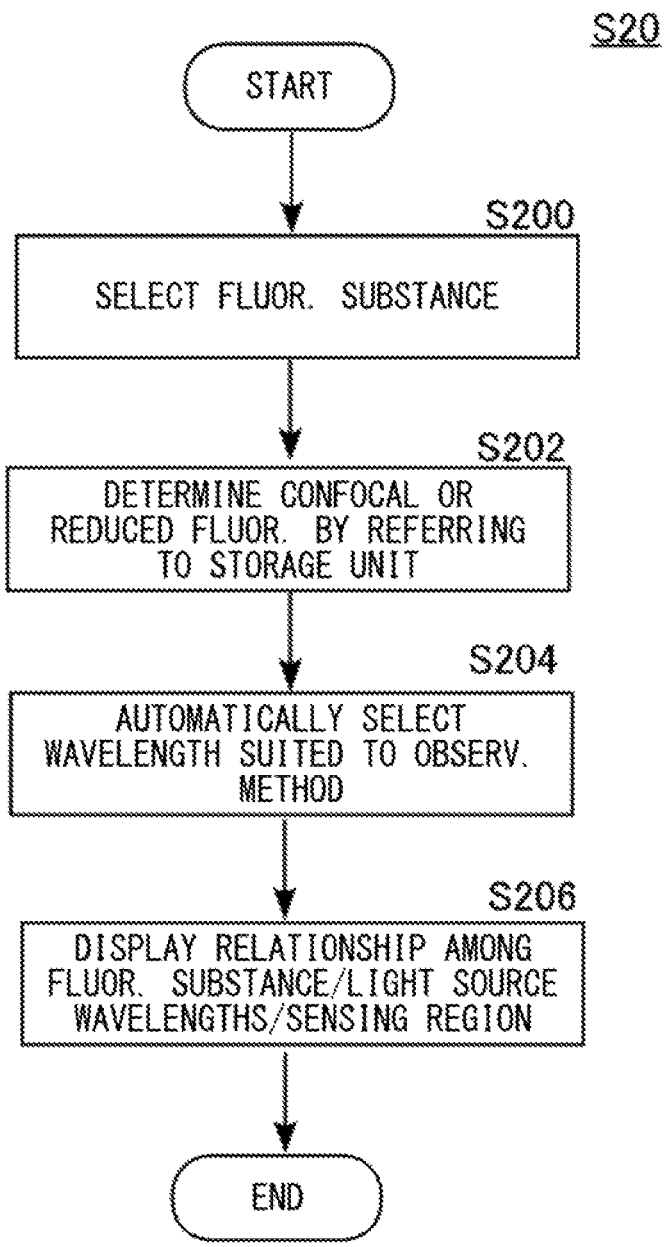
FIG. 13 is a flowchart of an operation (S20) of automatically selecting whether to perform confocal observation or to perform reduced fluorescence observation in the microscope device 12.
Figure 14:
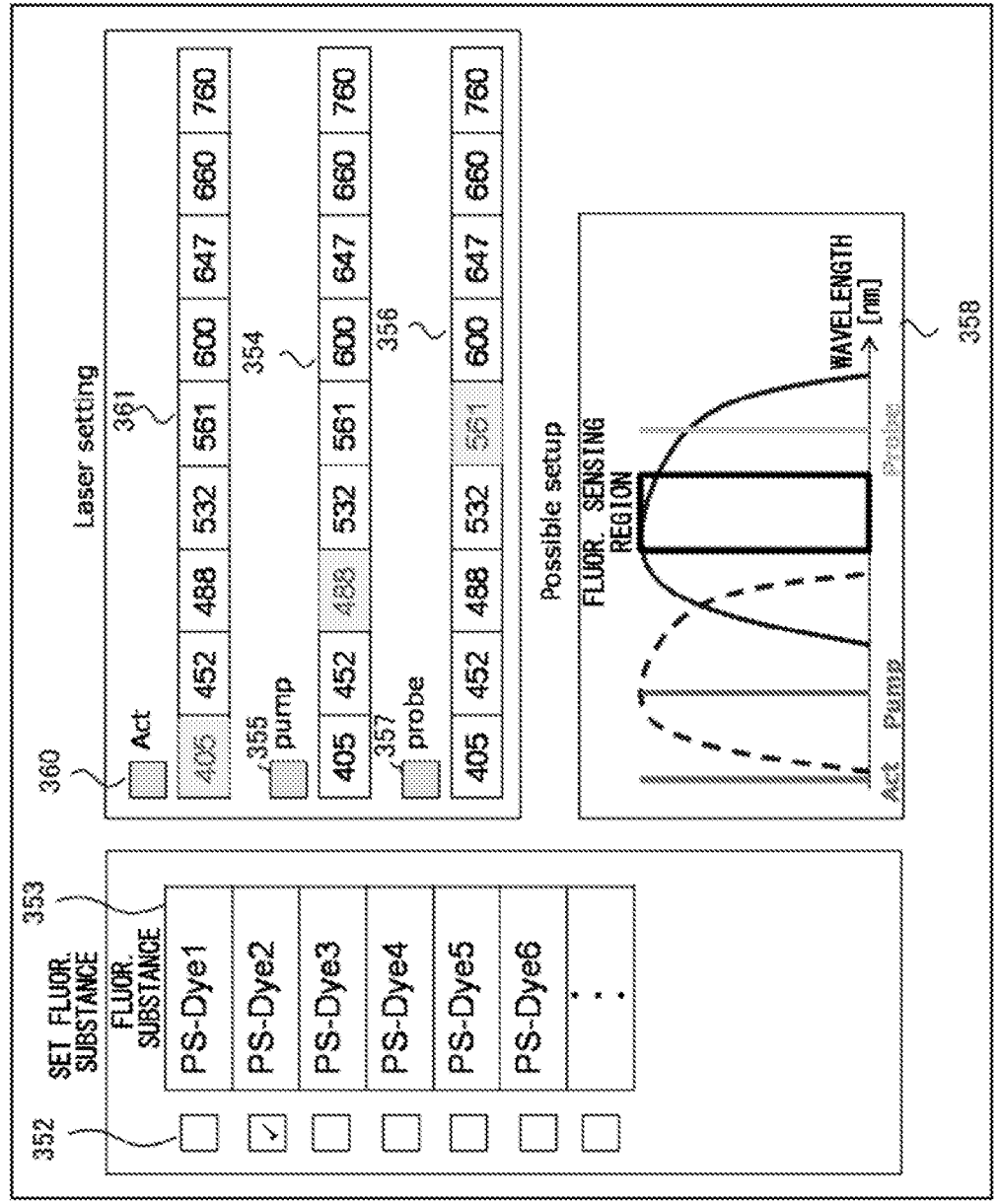
FIG. 14 illustrates a GUI screen 350 used in the operation.

FIG. 13 is a flowchart of an operation (S20) of automatically selecting whether to perform confocal observation or to perform reduced fluorescence observation in the microscope device 12, and FIG. 14 illustrates a GUI screen 350 used in the operation.

The storage unit 226 stores information that is associated with names of fluorescent substances, and indicates whether confocal observation is preferable or reduced fluorescence observation is preferable, and the wavelength of pump light in the case of confocal observation, or the wavelengths of pump light and probe light in the case of reduced fluorescence observation. The GUI screen 350 displays the names of fluorescent substances 353 stored in the storage unit 226 along with check boxes 352.

A check mark placed in a check box 352 by a user indicates a selected fluorescent substance (S200). The control unit 130 determines whether confocal observation is preferable or reduced fluorescence observation is preferable depending on the selected fluorescent substance by referring to the storage unit 226 (S202). If it is determined that confocal observation is preferable, a box 355 for pump light is colored on the GUI screen 350, and the wavelength of pump light corresponding to the fluorescent substance is automatically selected, and displayed on a display field 354 (S204). In this case, a box 360 for activation light and a box 357 for probe light are white, and display fields 356, 361 for wavelengths are grayed out. If it is determined that reduced fluorescence observation is preferable, the box 355 for pump light is colored on the GUI screen 350, the wavelength of pump light corresponding to the fluorescent substance is automatically selected, and displayed in the display field 354, moreover the box 360 for activation light, and the box 357 for probe light are also colored, and the wavelength of activation light, and the wavelength of probe light corresponding to the fluorescent substance are automatically selected, and displayed in the display fields 356, 361 (S204). In either case, a relationship among the absorption band, and fluorescence band of the fluorescent substance, the wavelengths of the light sources, and a sensing region is illustrated in a display field 358 (S206).

If it is determined that reduced fluorescence observation is preferable, the wavelength control unit 230 sets the wavelengths of light from the laser light sources 102, 104, 500 based on an instruction from a user about execution. Furthermore, the frequency control unit 229 sets modulation frequencies in the oscillator 132. In this case, input of modulation frequencies may be accepted on the GUI screen 300 illustrated in FIG. 10, or modulation frequencies may be stored in the storage unit 226 in association with fluorescent substances, and a modulation frequency may be automatically set according to selection of a fluorescent substance. Based on the above-mentioned settings, a reduced fluorescence observation image is acquired in a similar manner to Steps S102 to S106 in FIG. 11.

On the other hand, if it is determined that confocal observation is preferable, the wavelength control unit 230 sets the wavelengths of light from the laser light source 102 based on an instruction from a user about execution. Based on the above-mentioned settings, a confocal observation image is acquired in a similar manner to Steps S112 to S118 in FIG. 11.

Figure 15:
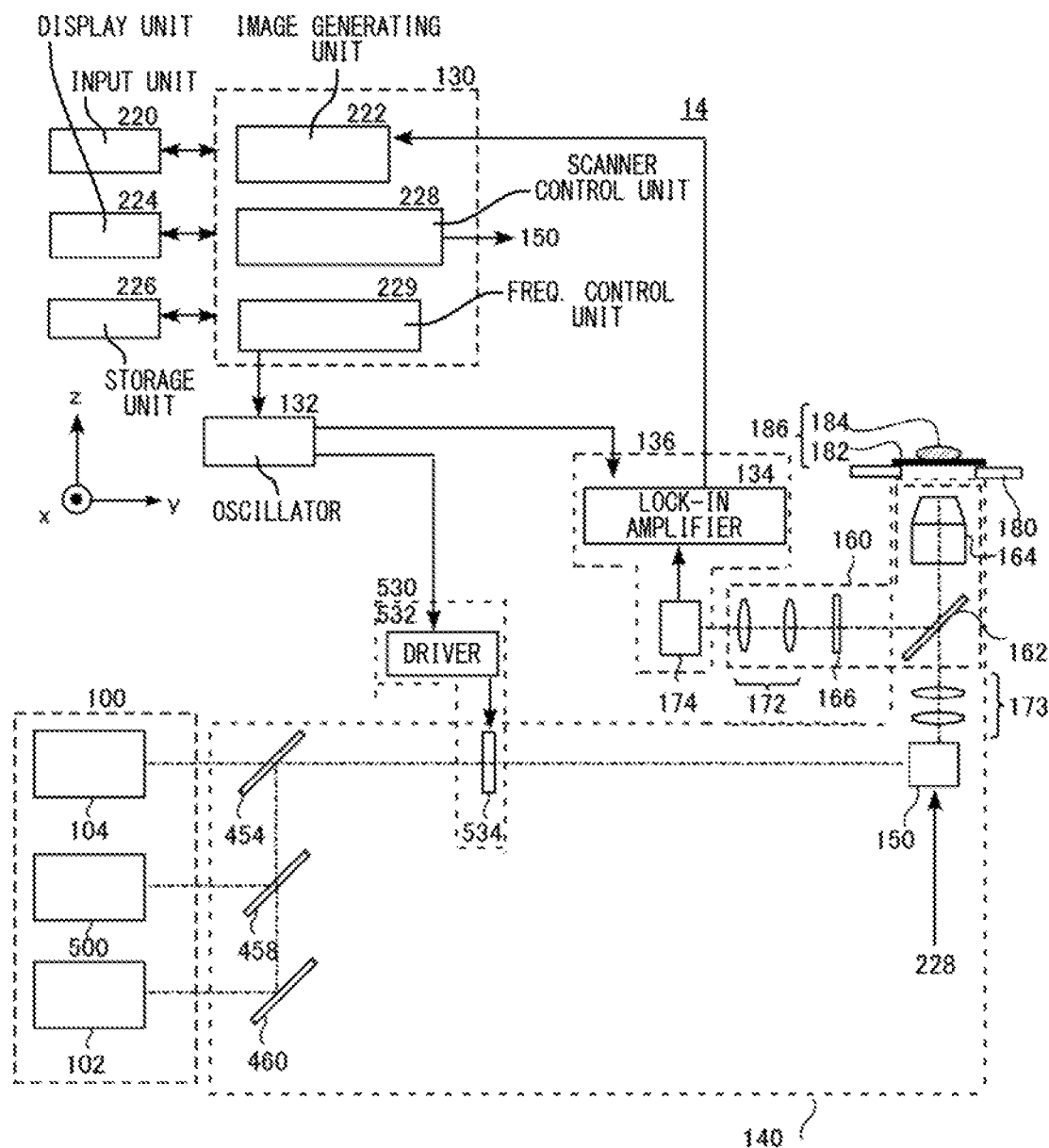
FIG. 15 is a figure illustrating the configuration of still another microscope device 14.

FIG. 15 is a figure illustrating the configuration of still another microscope device 14. Configurations of the microscope device 14 that are the same as the configurations in the microscope devices 10, 12 are given the same reference numerals, and explanations thereof are omitted.

The microscope device 10 is provided with the AOM 514 for intensity-modulation of activation light, and moreover with the AOM 524 for intensity-modulation of probe light. In contrast, the microscope device 14 modulates both activation light and probe light by a single acousto-optic tunable filter (also referred to as AOTF) 534. The AOTF 534 and a driver 532 constitute an intensity-modulating unit 530.

In this case, the driver 532 uses the AOTF 534 to intensity-modulate activation light at f1, and probe light at f3 based on oscillation from the oscillator 132. Since the AOTF 534 is capable of intensity-modulation at different frequencies for different wavelengths, multicolor observation can be realized with a simpler device configuration. In this case, pump light is not intensity-modulated, but kept in the ON-state always.

Note that if the wavelength of probe light becomes short and approaches the excitation spectrum of a sample, fluorescence excitation by the probe light cannot be neglected in some cases. Since this signal is produced as the product of activation light and probe light, it has lower resolution than a PSN-RF signal, and there is a fear that it might degrade resolution if mixed in. In this case, the pump light is desirably intensity-modulated at the frequency f2. An intensity-modulating unit for pump light may further be provided for modulation of pump light, or the AOTF 534 in the microscope device 14 may intensity-modulate pump light, in addition to activation light and probe light. In order to sense a PSN-RF signal, the demodulation frequency is desirably set to f1±f2±f3.

Figure 16:
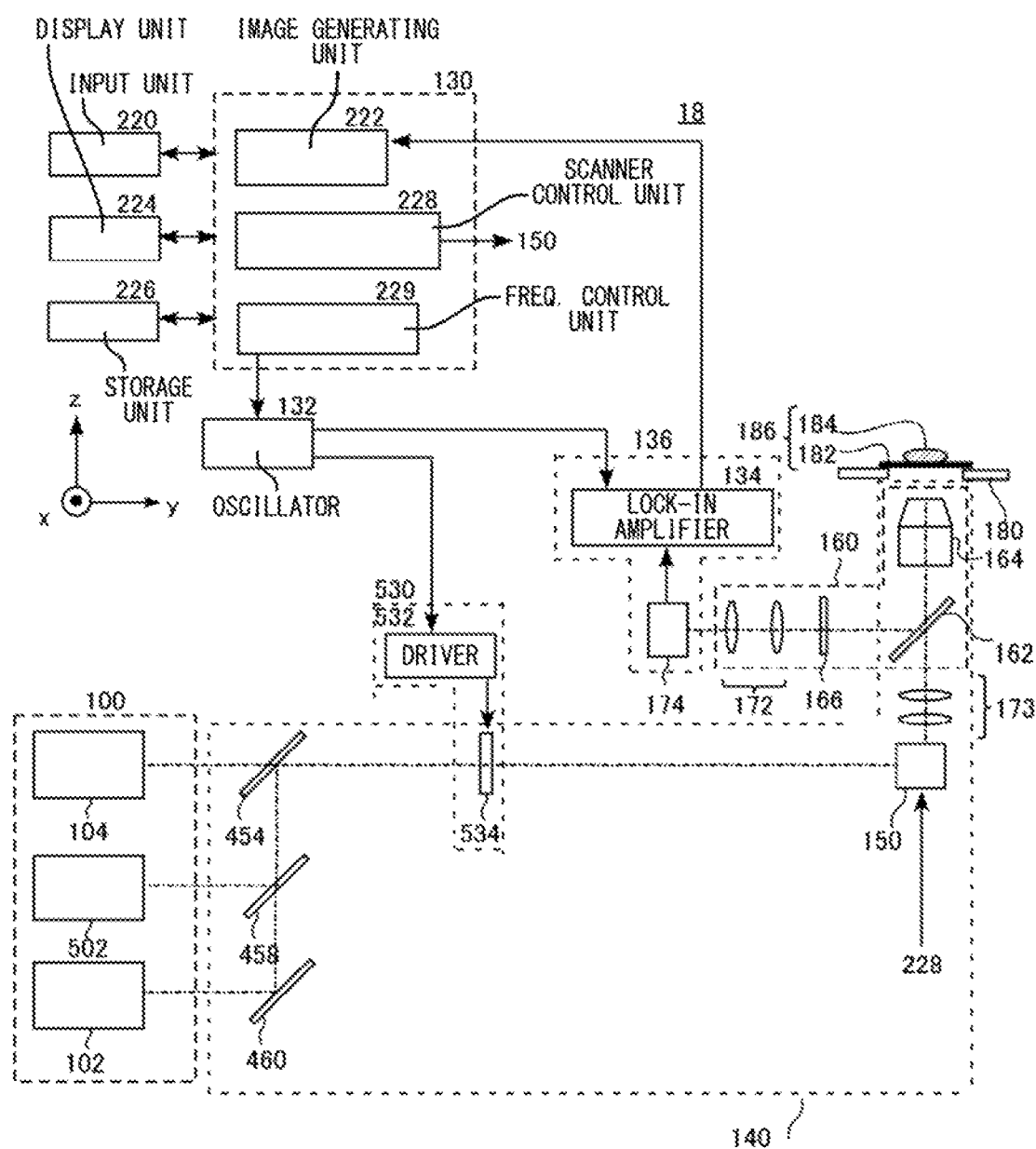
FIG. 16 is a figure illustrating the configuration of still another microscope device 18.

FIG. 16 is a figure illustrating the configuration of still another microscope device 18. The microscope device 18 irradiates the observed subject 184 including a positive switching fluorescent substance with deactivation light, and intensity-modulated pump light and probe light to thereby sense, by lock-in sensing, a signal of fluorescence that is produced by the fluorescent substance of the observed subject 184, and reduced due to stimulated emission. Note that configurations of the microscope device 18 that are the same as the configurations in the microscope devices 10 to 14 are given the same numbers, and explanations thereof are omitted.

Examples of the positive switching fluorescent substance include Kohinor.

The microscope device 18 has a laser light source 502 for deactivation light disposed instead of the laser light source 500 for activation light in the microscope device 14. For example, laser light with 405 nm is used for deactivation light, laser light with 488 nm is used for pump light, and laser light with 600 nm is used for probe light. The AOTF 534 intensity-modulates pump light and probe light at the frequencies f2, f3. In this case, deactivation light is not intensity-modulated, but kept in the ON-state always.

Figure 17:
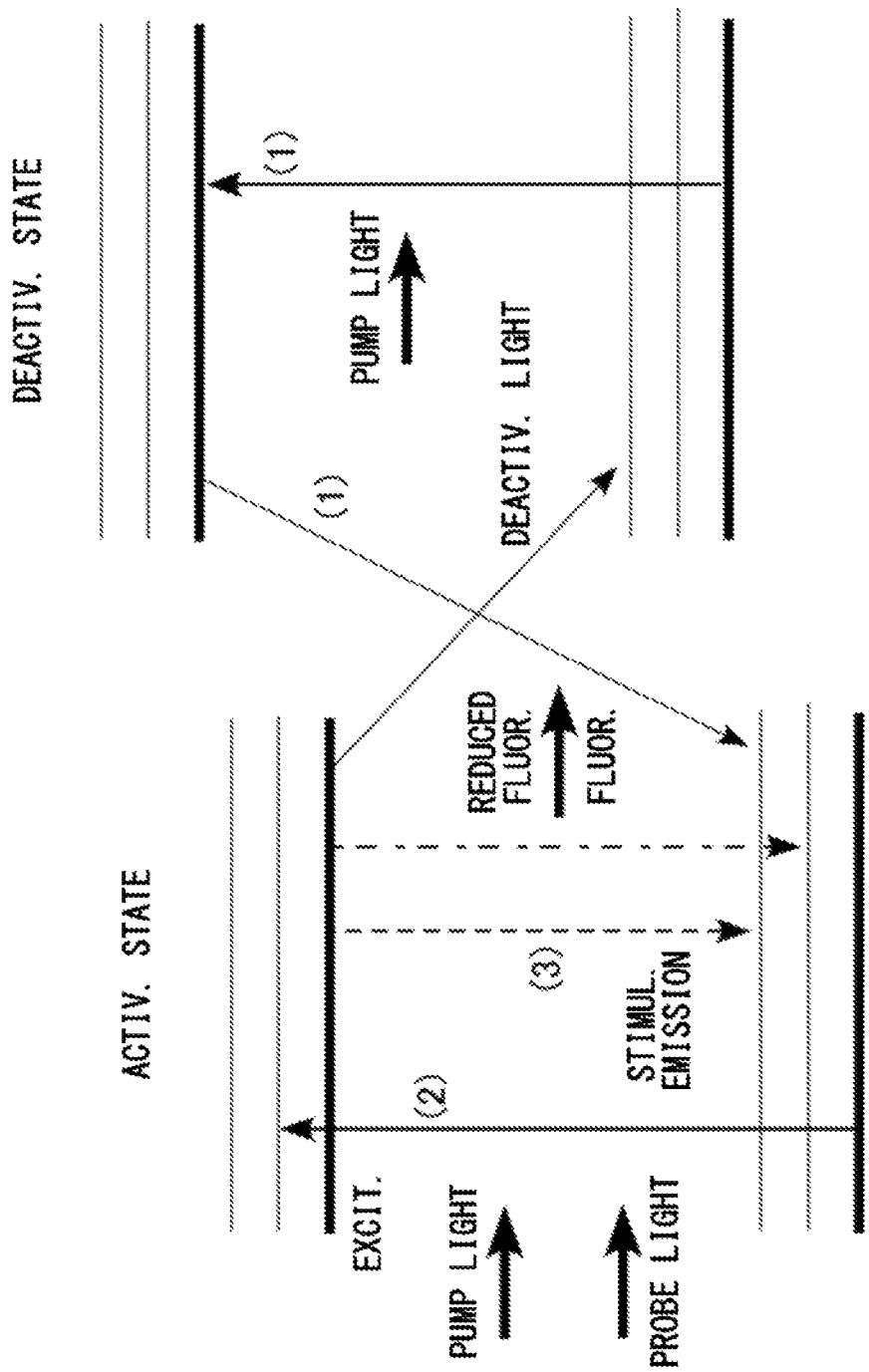
FIG. 17 is a state transition diagram.

Principles of observation based on reduced fluorescence using the microscope device 18 are explained with reference to FIG. 17. FIG. 17 is a state transition diagram.

The state transitions of a positive switching fluorescent substance occur as illustrated in FIG. 17. In the activated state, the positive switching fluorescent substance is excited by pump light, and emits fluorescence reduced due to stimulated emission induced by probe light. Furthermore, it undergoes a transition from the activated state to the deactivated state in which it cannot emit light due to excitation by deactivation light. Here, fluorescence signals produced through the following processes over time are sensed. (Step 1) Switching triggered by pump light (from the deactivated state to the activated state) (1)
(Step 2) Excitation by pump light (2)
(Step 3) Stimulated emission induced by probe light (3)

Since fluorescence signals produced through these processes are obtained as the product of pump light, pump light, and probe light, the signal generation region is restricted. A generated fluorescence signal is defined as a PSP-RF signal. This fluorescence signal is desirably set as being in a region in the fluorescence spectrum of the observed subject 184 which does not overlap the region of probe light. Because of this, it is desirable to remove deactivation light, pump light, and probe light by the optical filter 166.

In order to sense a PSP-RF produced through these three processes, the pump light intensity is modulated at the frequency f2, and the probe light intensity is modulated at the frequency f3. $I_{Deact}$, $I_{Pump}$, and $I_{Probe}$ are defined as time waveforms of the deactivation light, pump light, and probe light, respectively, and then:

[Formula 6]

$$I_{Deact}(t) = I_1 \quad (2.1)$$

$$I_{Pump}(t) = I_2[1+\cos(f_2 t)] \quad (2.2)$$

$$I_{Probe}(t) = I_3[1+\cos(f_3 t)] \quad (2.3)$$

Here, I1, I2, and I3 are the optical intensities of the deactivation light, pump light, and probe light, respectively. The PSP-RF signal is:

[Formula 7]

$$I_{PSN-RF}(t) \propto I_{Pump}^2(t) I_{probe}(t) \quad (2.4)$$
$$= I_2^2 I_3 [1+\cos(f_2 t)]^2 [1+\cos(f_3 t)]$$
$$= I_2^2 I_3 \begin{bmatrix} \frac{3}{2} + 2\cos f_2 t + \frac{3}{2}\cos f_3 t + \frac{1}{2}\cos 2 f_2 t + \\ \cos[(f_2+f_3)t] + \cos[(f_2-f_3)t] + \\ \frac{1}{4}\cos[(2f_2+f_3)t] + \frac{1}{4}\cos[(2f_2-f_3)t] \end{bmatrix}$$

Accordingly, by acquiring fluorescence signals produced at 2f2±f3, PSP-RF signals with enhanced resolution can be acquired. More specifically, the above-mentioned demodulation frequency is input from the oscillator 132 to the lock-in amplifier 134. The lock-in amplifier 134 extracts a signal that is synchronized with the demodulation frequency. While the scanning unit 150 is scanning the observed subject 184, the lock-in amplifier 134 performs lock-in sensing pixel by pixel, and stores results of the lock-in sensing in the storage unit 226, associating a result about each pixel with positional information about the pixel. The image generating unit 222 reads out the sensing results associated with the positional information from the storage unit 226, generates a reduced fluorescence observation image, and displays the image on the display unit 224.

Figure 18:
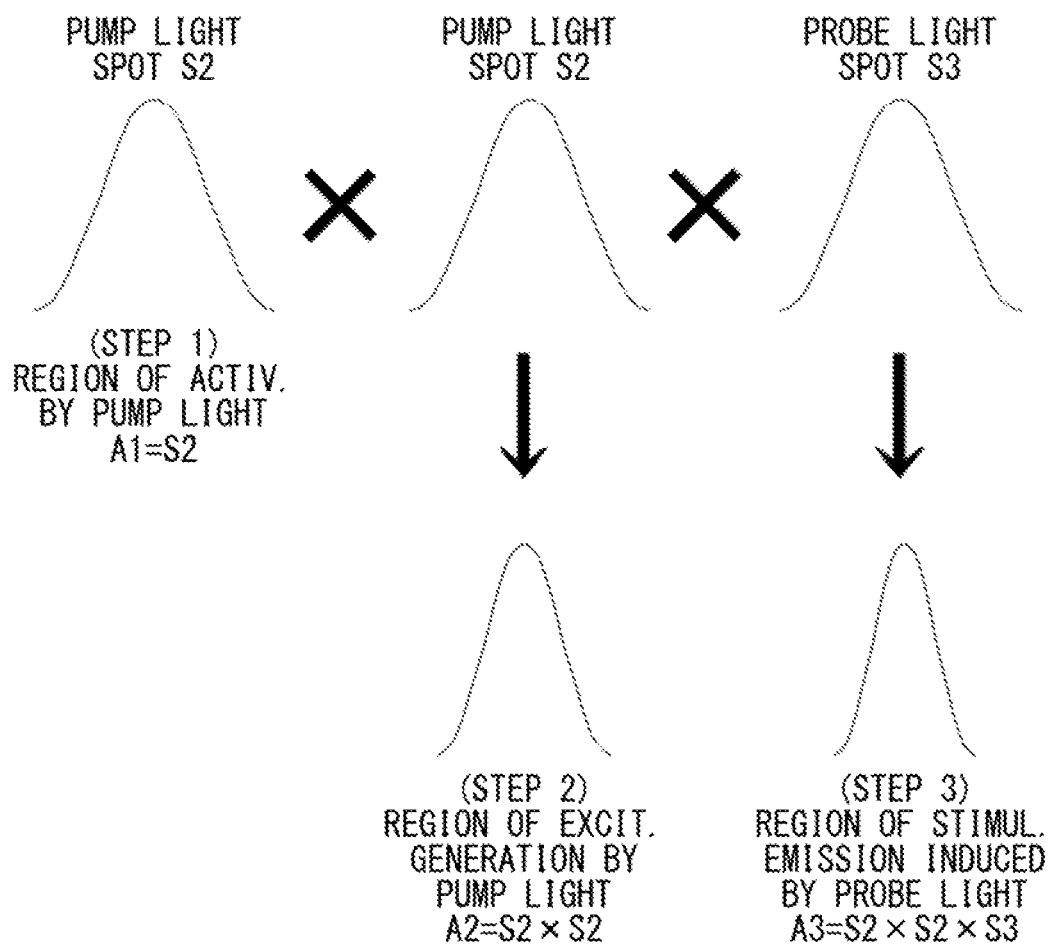
FIG. 18 is a figure for explaining resolution enhancement.

FIG. 18 is a figure illustrating principles of resolution enhancement. S1, S2, and S3 are defined as the intensity distributions of light spots of deactivation light, pump light, and probe light, respectively. (Step 1) If $A_1$ is defined as the generation distribution indicating generation of optical switching (OFF→ON) triggered by pump light, since the generation distribution is equal to the intensity distribution of pump light:

[Formula 8]

$$A_1 = S_2 \quad (2.5)$$

(Step 2) $A_2$ is defined as the generation distribution indicating generation of excitation by pump light. Since this signal generation distribution is equal to the product of the generation distribution $A_1$ at Step 1 and the intensity distribution S2 of a pump light spot:

[Formula 9]

$$A_2 = A_1 S_2 = S_2^2 \quad (2.6)$$

(Step 3) $A_3$ is defined as the generation distribution indicating generation of stimulated emission induced by probe light. Since this signal generation distribution is equal to the product of the generation distribution $A_2$ at Step 2 and the intensity distribution S3 of a probe light spot:

[Formula 10]

$$A_3 = A_2 S_3 = S_2^2 S_3 \quad (2.7)$$

This generation distribution $A_3$ is equivalent to the generation distribution of PSP-RF signals. In this manner, by sensing fluorescence signals produced in the distribution as represented by the product of the three types of light, it is possible to emphasize contribution of fluorescence generation from the center of a light spot, and to de-emphasize contribution of fluorescence generation from the perimeter of the light spot as illustrated in FIG. 18; therefore, the region of signal generation from the observed subject 184 can be restricted to the diffraction limitation or lower; as a result, the resolution can be enhanced.

In another possible configuration, each position of the observed subject 184 where light is concentrated may be irradiated with deactivation light first, and then irradiated with pump light and probe light. Since the probability of switching to the ON-state due to probe light increases thereby, an advantage of enhancing the signal-to-noise ratio is provided.

Figure 19:
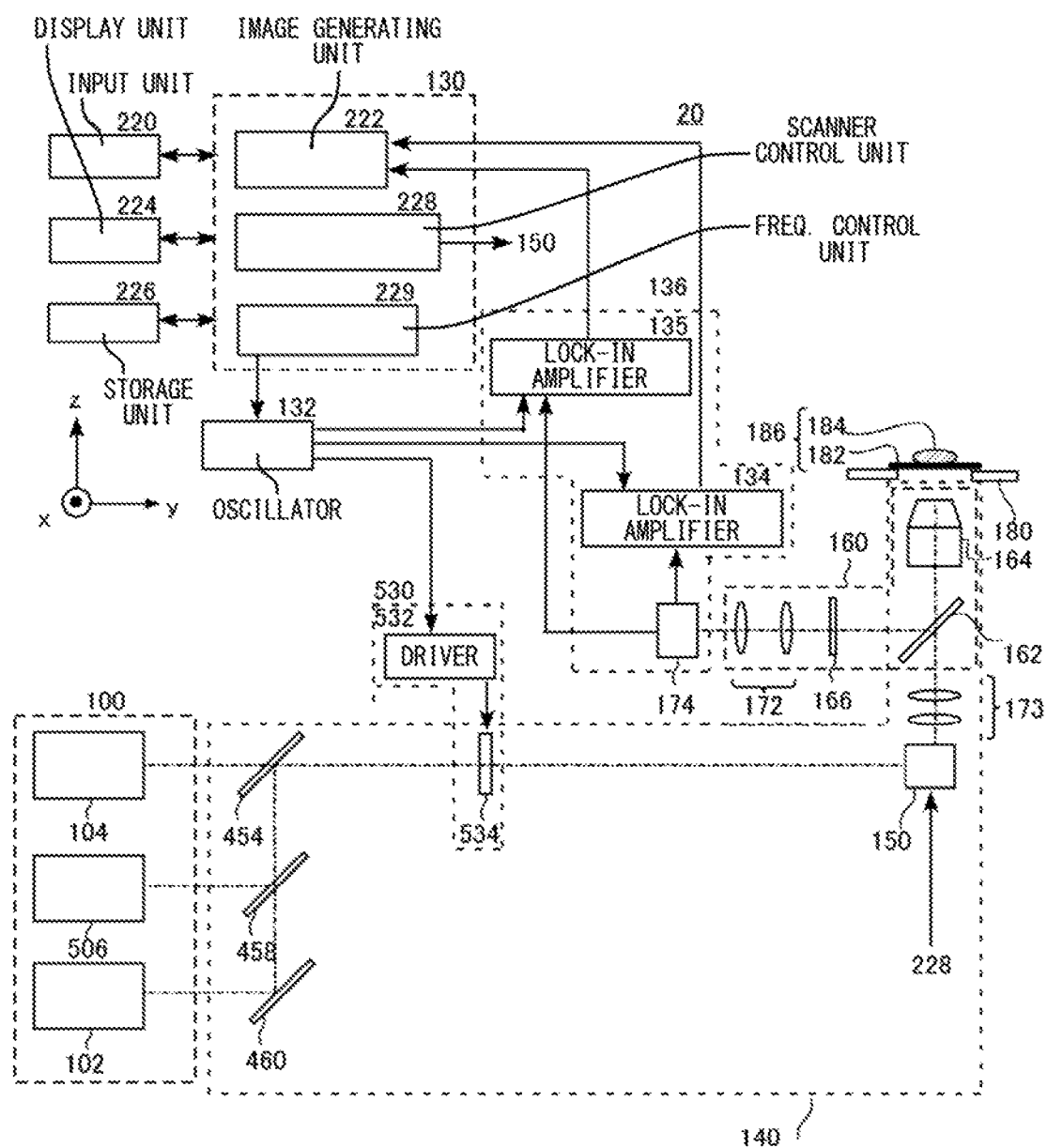
FIG. 19 is a figure illustrating the configuration of still another microscope device 20.

FIG. 19 is a figure illustrating the configuration of still another microscope device 20. Configurations of the microscope device 20 that are the same as the configurations in the microscope devices 10 to 18 are given the same numbers, and explanations thereof are omitted.

The microscope device 20 irradiates the observed subject 184 including both a positive switching fluorescent substance and a negative switching fluorescent substance with pump light and probe light, and activation light and deactivate to thereby sense, by lock-in sensing, signals of fluorescence that is produced by the positive switching fluorescent substance, and negative switching fluorescent substance of the observed subject 184, and reduced due to stimulated emission. Particularly, the microscope device 20 can simultaneously observe reduced fluorescence signals from the positive switching fluorescent substance, and reduced fluorescence signals from the negative switching fluorescent substance.

The microscope device 20 is different from the microscope device 14 in that it is provided with a laser light source 506 for switching light, and another lock-in amplifier 135. In addition, both the positive switching fluorescent substance, and the negative switching fluorescent substance are introduced to the observed subject 184.

Switching light emitted from the laser light source 506 functions as activation light for the negative switching fluorescent substance, and functions as deactivation light for the positive switching fluorescent substance. In other words, the negative switching fluorescent substance and positive switching fluorescent substance that are used are activated and deactivated, respectively, by light with the same wavelengths. Using such fluorescent substances provides advantages of simplifying the device configuration, and reducing the cost since a single common switching light can be used.

Note that the phrase "the same wavelengths" does not require wavelengths to be completely the same, as long as they are within a wavelength range of light emitted from the laser light source 506. Light wavelengths of laser light to be used are, for example, 405 nm for switching light, 488 nm for pump light, and 600 nm for probe light.

The microscope device 20 uses the AOTF 534 to intensity-modulate switching light at f1, pump light at f2, and probe light at f3. Generated fluorescence signals are received at the light-receiving unit 174, and output signals from the light-receiving unit 174 are branched, and input to the lock-in amplifiers 134, 135.

The lock-in amplifier 134 is for acquiring signals from the negative switching fluorescent substance, and its demodulation frequency is set to $f_1 \pm f_2 \pm f_3$. On the other hand, the lock-in amplifier 135 is for acquiring signals from the positive switching fluorescent substance, and its demodulation frequency is set to $2f_2 \pm f_3$. By providing a difference between the demodulation frequencies in this manner, probes of the negative switching fluorescent substance and the positive switching fluorescent substance can be observed simultaneously in the same device configuration.

Figure 20:
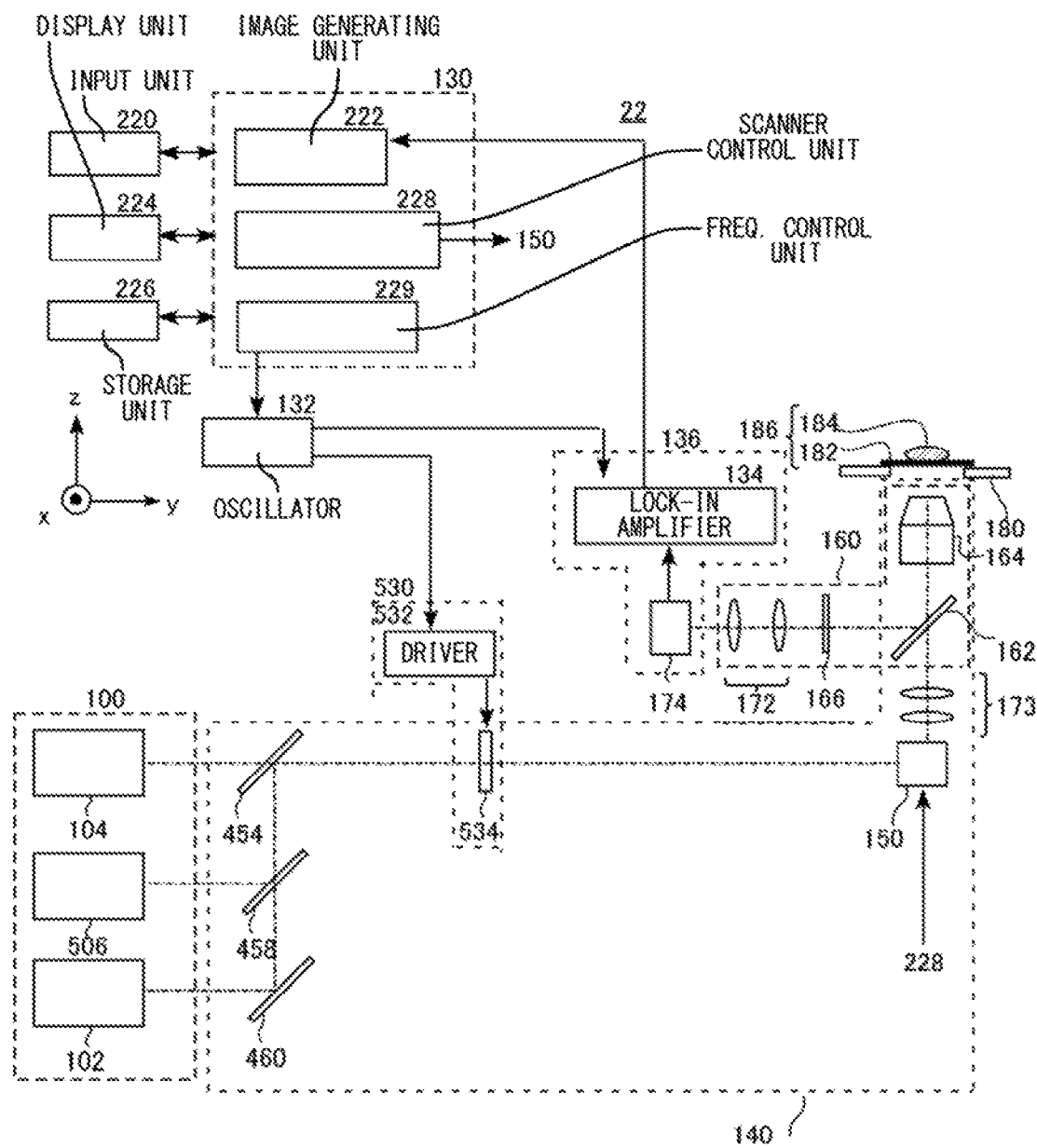
FIG. 20 is a figure illustrating the configuration of still another microscope device 22.

FIG. 20 is a figure illustrating the configuration of still another microscope device 22. Configurations of the microscope device 22 that are the same as the configurations in the microscope devices 10 to 20 are given the same numbers, and explanations thereof are omitted.

Similar to the microscope device 20, the microscope device 22 irradiates the observed subject 184 including both a positive switching fluorescent substance and a negative switching fluorescent substance with pump light and probe light, and activation light and deactivation light to thereby sense, by lock-in sensing, signals of fluorescence that is produced by the positive switching fluorescent substance, and negative switching fluorescent substance of the observed subject 184, and reduced due to stimulated emission. Note that the microscope device 22 can sequentially, that is, in a time-divided manner, observe reduced fluorescence signals from the positive switching fluorescent substance, and reduced fluorescence signals from the negative switching fluorescent substance.

The microscope device 22 is different from the microscope device 20 in that it is not provided with the lock-in amplifier 135. On the other hand, the single lock-in amplifier 134 is used for sensing with demodulation frequencies that are varied in a time-divided manner. More specifically, as illustrated in Table 1, the AOTF 534 intensity-modulates switching light at f1, pump light at f2, and probe light at f3, and irradiates the observed subject 184 with them. Signals output at the light-receiving unit 174 are sensed by lock-in sensing at the lock-in amplifier 134 at a demodulation frequency fp in one time period to thereby sense reduced fluorescence signals from the positive switching fluorescent substance. In another time period, signals are sensed by lock-in sensing at the lock-in amplifier 134 at a demodulation frequency fn to thereby sense reduced fluorescence signals from the negative switching fluorescent substance.

TABLE 1

| | Positive | Negative |
|---|---|---|
| Switching Light | | $f_1$ |
| Pump Light | $f_2$ | $f_2$ |
| Probe Light | $f_3$ | $f_3$ |
| Demodulation Frequency | $f_p = 2f_2 \pm f_3$ | $f_n = f_1 \pm f_3$ $f_n = f_1 \pm f_2 \pm f_3$ |

Figure 21:
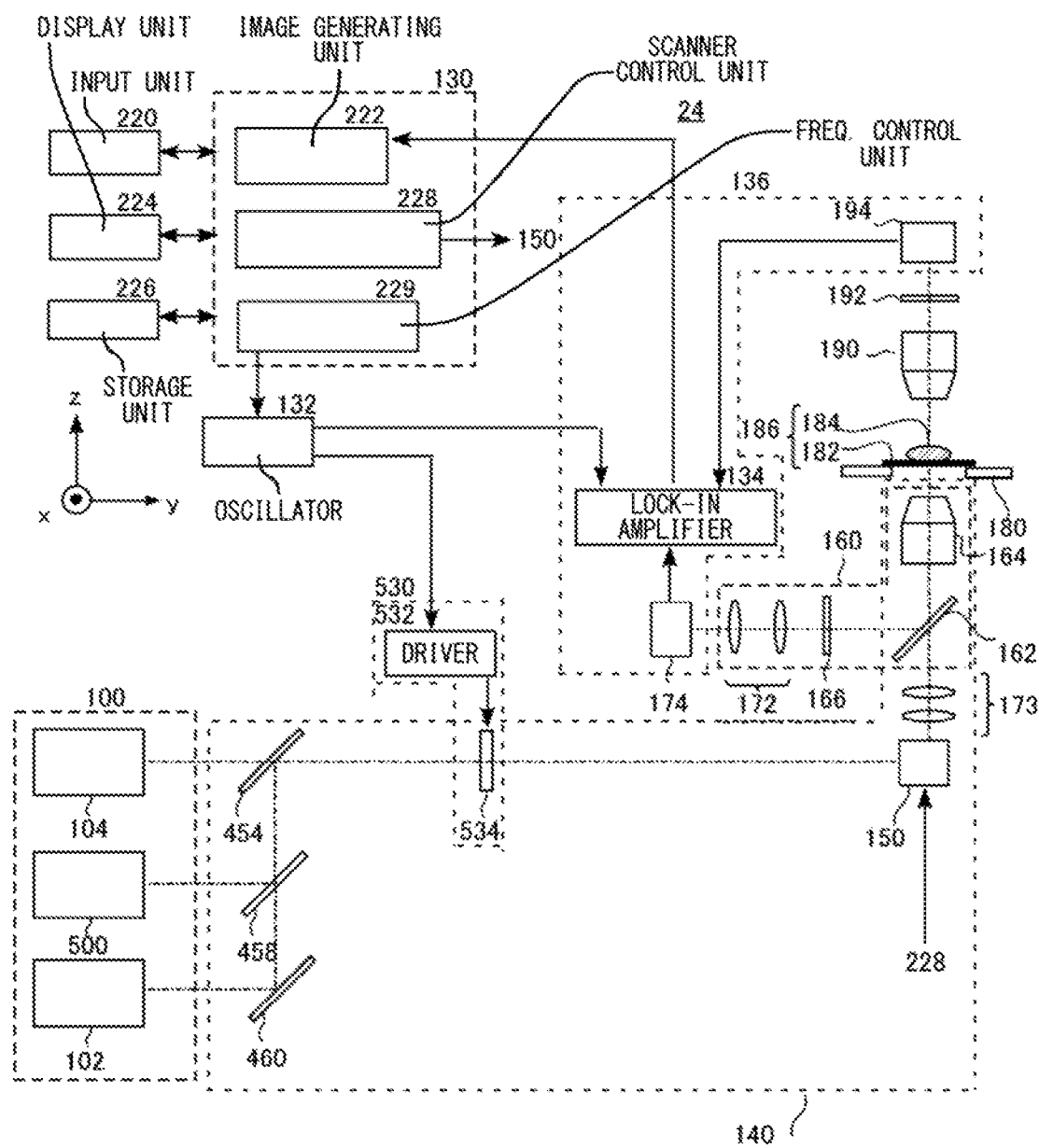
FIG. 21 is a figure illustrating the configuration of still another microscope device 24.

FIG. 21 is a figure illustrating the configuration of still another microscope device 24. Configurations of the microscope device 24 that are the same as the configurations in the microscope devices 10 to 22 are given the same numbers, and explanations thereof are omitted.

The microscope device 24 has an object lens 190 disposed to face the object lens 164, and further has an optical filter 192, and a sensing unit 194 disposed in the optical path from the object lens 190. An example of the sensing unit 194 is a photodiode. In addition, the optical filter 192 transparently transmits therethrough light in a wavelength band including the wavelength of probe light, and blocks light in other wavelength regions.

As illustrated in Table 2, the AOTF 534 intensity-modulates switching light at f1, pump light at f2, and probe light at f3, and irradiates the observed subject 184 with them. Signals output at the light-receiving unit 174 are sensed by lock-in sensing at the lock-in amplifier 134 at the demodulation frequency fm to thereby sense reduced fluorescence signals from the positive switching fluorescent substance, and signals output at the light-receiving unit 194 are sensed by lock-in sensing to thereby sense signals induced by probe light having passed through the observed subject 184. Since the signal generation region of stimulated emission light due to probe light becomes an overlapping region of activation light, pump light, and probe light, spatial resolution can be enhanced similar to fluorescence sensing. Note that if a filter with such a narrow band that only the wavelength of probe light is transparently transmitted is used as the optical filter 192, only stimulated emission light is sensed. On the other hand, since fluorescence is sensed in addition to probe light if a wide-band filter is used, the amount of light increases.

TABLE 2

| | | (1) Fluorescence Sensing | (2) Stimulated Emission Sensing |
|---|---|---|---|
| Activation Light | $f_1$ | $f_1$ | $f_1$ |
| Pump Light | | $f_2$ | $f_2$ |
| Probe Light | $f_3$ | $f_3$ | $f_3$ |
| Demodulation Frequency: $f_m$ | $f_1 \pm f_3$ | $f_1 \pm f_2 \pm f_3$ | $f_1 \pm f_2 \pm f_3$ |

Since, in this device configuration, PSN-RF signals described in the first embodiments can also be acquired, it is possible to readily switch which signal is to be acquired, simply by altering the frequency. Alternatively, two lock-in amplifiers are prepared, and their respective demodulation frequencies are set for fluorescence sensing and stimulated emission sensing according to Table 2 to thereby enable simultaneous observation. Note that, although the case where stimulated emission signals from a negative switching fluorescent substance are acquired is explained here as an example, the techniques can be similarly be applied also to a positive switching fluorescent substance.

Note that instead of the scanning unit 150, the scanning unit 151 illustrated in FIG. 7 or the scanning unit 156 illustrated in FIG. 8 may be used in the microscope devices 12 to 24.

The laser light sources 102, and the like used are continuous wave laser light sources, but may be pulsed laser light sources. In addition, the light-receiving unit 174, and the like used are photomultiplier tubes, but may be avalanche photodiodes (APDs).

In addition, although one-photon excitation is used for excitation in the above-mentioned embodiments, multiphoton excitation such as two-photon excitation or three-photon excitation may be used.

A descan optical system in the microscope device 16 may be used in the microscope devices 14 to 24. In addition, in a configuration of sensing fluorescence by descanning at the time of reduced fluorescence observation, the pinhole 408 or the like may be narrowed. As a result, the point spread function of an imaging system also contributes to optical resolution enhancement, and so further resolution enhancement becomes possible. When a bright fluorescent substance that gives a sufficient amount of light is observed, it is desirable to adopt a configuration in which the pinhole 408 or the like is narrowed. On the other hand, when a dark fluorescent substance that does not give a sufficient amount of light is observed, it is desirable to adopt a configuration in which the pinhole 408 or the like is opened.

In addition, if there is a drawback of spot shift in the in-plane direction of pump light and probe light due to chromatic aberration of magnification at the time of wide field-of-view observation, or if there is a drawback of spot shift in the optical-axis direction of pump light and probe light due to axial chromatic aberration in observation of deep portions, it is desirable to make the beam diameter of pump light thinner than the beam diameter of probe light. Thereby, the spot of pump light widens in the in-plane direction/optical-axis direction, and it becomes easier to make beams overlapped. Note that a reason for making the beam diameter of pump light thin is because the spot diameter of pump light is smaller than that of probe light when spots with the same beam diameter are generated in the same object lens since pump light has a shorter wavelength than that of probe light.

AOTFs may be used instead of AOMs in any of the above-mentioned embodiments. In another example, an EOM (electro-optical element) and a polarizer may be used, and polarization directions may be switched at high speed to thereby realize optical intensity modulation. Alternatively, a mechanical shutter such as a chopper may be used.

In another possible configuration, a phase plate (radial polarizer) may be inserted in any of the optical paths of light in the microscope devices 10 to 26. Thereby, the point spread function of light transparently transmitted through the phase plate becomes sharper in the in-plane direction, and the resolution enhancement effect is increased. Generally, in return for a sharper distribution in the in-plane direction, a use of such a phase plate gives rise to drawbacks such as that (i) side lobes are produced, and (ii) the distribution in the optical-axis direction widens. However, since, in the proposed technique, the signal generation region is an overlapping region of three types of light, these drawbacks are overcome, and only a benefit of a sharper in-plane direction distribution can be enjoyed. Note that different phase plates may be inserted for different types of light, or a single phase plate may be inserted in a common optical path of the three types of light. Note that a phase plate with another shape may be used. In addition, a mask may be inserted instead of a phase plate, and the shape of the point spread function may be controlled by making the amplitude of light have a distribution. For example, even if a zone plate is inserted, and a Bessel beam is generated, similar effects can be attained.

In addition, similar to the microscope device 12, the microscope devices 10, 14, 18, 20, 22, 24 may also be provided with the wavelength control unit 230 to control the wavelengths of light from the laser light sources. In addition, although a microscope device is used in any of the above-mentioned embodiments, the embodiments may be applied not only to a microscope, but to any fluorescence observation device capable of observing reduced fluorescence.

In addition, although the dichroic mirrors 162, 402 transparently transmit therethrough illuminating light, and reflect fluorescence, instead, they may reflect illuminating light, and transparently transmit therethrough fluorescence.

Note that although lock-in amplifiers are explained as means for sensing signal components of particular frequencies, other methods may be utilized. For example, signal components of particular frequencies may be sensed after Fourier transform of time signals. For example, in another possible configuration, reference signals with the demodulation frequency may be multiplied with signal light by a frequency converter, and only DC components may be extracted. Note that "DC components" mentioned here are equivalent to values obtained by converting components vibrating in a sine wave form into direct current.

While the embodiments of the present invention have been described, the technical scope of the invention is not limited to the above described embodiments. It is apparent to persons skilled in the art that various alterations and enhancements can be added to the above-described embodiments. It is also apparent from the scope of the claims that the embodiments added with such alterations or enhancements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Note that in any of the microscope devices, switching light, pump light, and probe light desirably have the same polarization. For example, they desirably have the same linear polarization or circular polarization. Alternatively, in another possible configuration, images based on reduced fluorescence may be acquired in the case where pump light and probe light have mutually orthogonal linear polarization, and in the case where pump light and probe light have mutually parallel linear polarization, and the images may be compared to thereby visualize the polarization characteristics of an observed subject. This is because the efficiency of stimulated emission depends on polarization. Alternatively, in another possible configuration, switching light and pump light may have mutually orthogonal polarization. In this case, the polarization characteristics of optical switching can be visualized.

What is claimed is:

1. A fluorescence observation device for observing fluorescence from an observed subject including a negative switching fluorescent substance, the fluorescence observation device comprising:

an activation light source that provides an activation light that triggers a transition from a deactivated state to an activated state of the negative switching fluorescent substance;

a pump light source that provides a pump light that excites the negative switching fluorescent substance when in the activated state;

a probe light source that provides a probe light that induces stimulated emission of the observed subject;

a first intensity-modulating unit that intensity-modulates the activation light provided by the activation light source at a frequency f1, to thereby provide an intensity-modulated activation light;

a second intensity-modulating unit that intensity-modulates the probe light provided by the probe light source at a frequency f3 different from the frequency f1, to thereby provide an intensity modulated probe light; and a sensing unit that receives fluorescence from the observed subject irradiated with the pump light, the intensity-modulated probe light, and the intensity-modulated activation light, and thereby produces a reception-light signal, and that senses a component with a frequency of f1±f3 in the reception-light signal.

2. The fluorescence observation device according to claim 1, further comprising:

a scanning unit that two-dimensionally scans the observed subject with the pump light, the intensity-modulated probe light, and the intensity-modulated activation light.

3. The fluorescence observation device according to claim 2, wherein the scanning unit has a resonant mirror for scanning in a main scanning direction, and a galvano mirror for scanning in a sub-scanning direction.

4. The fluorescence observation device according to claim 3, wherein the sensing unit receives the fluorescence having passed through the scanning unit in a direction opposite to a direction of the pump light, the intensity-modulated probe light, and the intensity-modulated activation light.

5. The fluorescence observation device according to claim 4, further comprising:

a pinhole disposed immediately before the sensing unit, wherein the sensing unit receives the fluorescence having passed through the pinhole.

6. The fluorescence observation device according to claim 1, further comprising:

a third intensity-modulating unit that intensity-modulates the pump light provided by the pump light source at a frequency f2 different from both the frequencies f1, f3, to thereby provide intensity-modulated pump light, wherein the pump light irradiating the observed subject is the intensity-modulated pump light, and the sensing unit senses a component with a frequency of f1±f2±f3 in the reception-light signal.

7. A fluorescence observation device for observing fluorescence from an observed subject including a positive switching fluorescent substance, the fluorescence observation device comprising:

an deactivation light source that provides a deactivation light that triggers a transition from an activated state to a deactivated state of the positive switching fluorescent substance;

a pump light source that provides a pump light that excites the positive switching fluorescent substance when in the activated state;

a probe light source that provides a probe light that induces stimulated emission of the observed subject;

a first intensity-modulating unit that intensity-modulates the pump light provided by the pump light source at a frequency f2, to thereby provide an intensity-modulated pump light;

a second intensity-modulating unit that intensity-modulates the probe light provided by the probe light source at a frequency f3 different from the frequency f2, to thereby provide an intensity-modulated probe light; and a sensing unit that receives fluorescence from the observed subject irradiated with the intensity-modulated pump light, the intensity-modulated probe light, and the deactivation light, and thereby produces a reception-light signal, and that senses a component with a frequency of 2f2±f3 in the reception-light signal.

8. The fluorescence observation device according to claim 7, further comprising:

a scanning unit that two-dimensionally scans the observed subject with the intensity-modulated pump light, the intensity-modulated probe light, and the deactivation light.

9. The fluorescence observation device according to claim 8, wherein the scanning unit has a resonant mirror for scanning in a main scanning direction, and a galvano mirror for scanning in a sub-scanning direction.

10. The fluorescence observation device according to claim 9, wherein the sensing unit receives the fluorescence having passed through the scanning unit in a direction opposite to a direction of the intensity-modulated pump light, the intensity-modulated probe light, and the deactivation light.

11. The fluorescence observation device according to claim 10, further comprising:

a pinhole disposed immediately before the sensing unit, wherein the sensing unit receives the fluorescence having passed through the pinhole.

12. A fluorescence observation method for observing fluorescence from an observed subject including a negative switching fluorescent substance, the fluorescence observation method comprising:

receiving an activation light that triggers a transition from a deactivated state to an activated state of the negative switching fluorescent substance;

receiving a pump light that excites the negative switching fluorescent substance when in the activated state;

receiving a probe light that induces stimulated emission of the observed subject;

intensity-modulating the received activation light at a frequency f1, to thereby provide an intensity-modulated activation light;

intensity-modulating the received probe light at a frequency f3 different from the frequency f1, to thereby provide an intensity-modulated probe light;

irradiating the observed subject with the pump light, the intensity-modulated probe light, and the intensity-modulated activation light;

receiving, at a light-receiving unit, fluorescence from the observed subject irradiated with the pump light, the intensity-modulated probe light, and the intensity-modulated activation light, and thereby producing a reception-light signal; and sensing a component with a frequency of f1±f3 in the reception-light signal.

13. A fluorescence observation method for observing fluorescence from an observed subject including a positive switching fluorescent substance, the fluorescence observation method comprising:

receiving a deactivation light that triggers a transition from an activated state to a deactivated state of the positive switching fluorescent substance;

receiving a pump light that excites the positive switching fluorescent substance when in the activated state;

receiving a probe light that induces stimulated emission of the observed subject;

intensity-modulating the received pump light at a frequency f2, to thereby provide an intensity-modulated pump light;

intensity-modulating the received probe light at a frequency f3 different from the frequency f2, to thereby provide an intensity-modulated probe light;

irradiating the observed subject with the intensity-modulated pump light, the intensity-modulated probe light, and the deactivation light;

receiving, at a light-receiving unit, fluorescence from the observed subject irradiated with the intensity-modulated pump light, the intensity-modulated probe light, and the deactivation light, and thereby producing a reception-light signal; and sensing a component with a frequency of $2f2 \pm f3$ in the reception-light signal.

* * * * *